United States Patent [19]
Sato et al.

[11] Patent Number: 5,357,583
[45] Date of Patent: Oct. 18, 1994

[54] GRAPHICS PROCESSING APPARATUS FOR SMOOTHING EDGES OF IMAGES

[75] Inventors: Takashi Sato; Hiroki Kubozono, both of Yokohama; Hitomi Kumazaki, Koshigaya; Masaki Sano, Yokohama; Kan Tomita; Yoshiaki Hanyu, both of Tokyo, all of Japan

[73] Assignee: Ricoh Company, Ltd., Tokyo, Japan

[21] Appl. No.: 914,746

[22] Filed: Jul. 16, 1992

[30] Foreign Application Priority Data

Jul. 19, 1991 [JP] Japan .................. 3-204777

[51] Int. Cl.$^5$ ............................. G06K 9/00
[52] U.S. Cl. ................................. 382/22; 382/54
[58] Field of Search ............ 382/22, 54; 358/463; 395/107

[56] References Cited

U.S. PATENT DOCUMENTS

| | | | |
|---|---|---|---|
| 4,975,785 | 12/1990 | Kantor | 358/463 |
| 5,005,139 | 4/1991 | Tung | 382/54 |
| 5,029,227 | 7/1991 | Kawamura | 382/22 |

FOREIGN PATENT DOCUMENTS

| | | |
|---|---|---|
| 3508606 | 12/1985 | Fed. Rep. of Germany . |
| 2-112966 | 4/1990 | Japan . |

OTHER PUBLICATIONS

Franklin C. Crow, "A Comparison of Antialiasing Techniques," *IEEE CG & A*, vol. 1, No. 1, pp. 40–48.

*Primary Examiner*—David K. Moore
*Attorney, Agent, or Firm*—Mason, Fenwick & Lawrence

[57] ABSTRACT

A graphics processing apparatus includes a first detection part for detecting, with respect to each pixel of an image, whether or not an edge of the image starts on a scanline, and for setting a control data depending on whether or not the edge starts on the scanline, a second detection part for detecting a duration of beam power modulation corresponding to one or plural edge pixels being intersected by a line defined in the image, and for setting a duration data, a third detection part for detecting an outermost edge pixel in the edge pixels, a part for generating a beam power data indicating an intensity level of light beam power corresponding to the outermost edge pixel, an output part for outputting the image by means of a printer having a light source for emitting a light beam, and a control means for continuously modulating light beam power of the light source from the intensity level to a predetermined level with respect to the edge pixels, so that an image with smooth edges is generated by modulating the light beam power of the light source in accordance with the control data and the duration data.

10 Claims, 44 Drawing Sheets

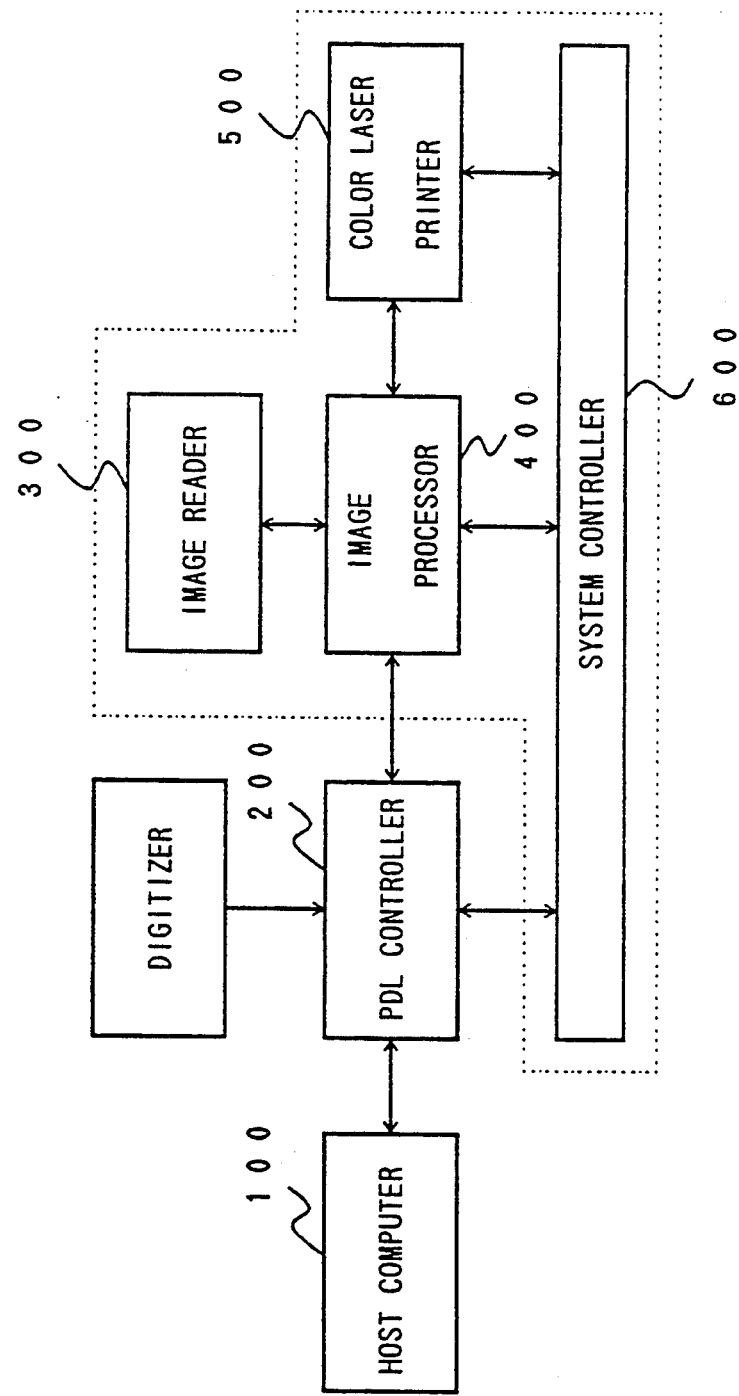

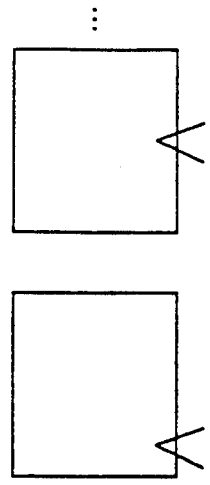
FIG. 4C
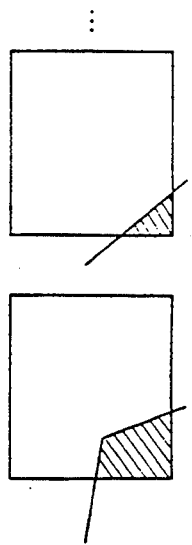
FIG. 4D
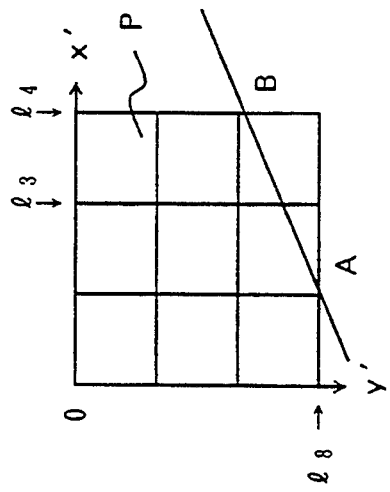
FIG. 4A
FIG. 4B
| EDGE FLAG | | LINE FLAG | | | | | | | | | AREA FACTOR |
|---|---|---|---|---|---|---|---|---|---|---|---|
| LH | RH | $l_1$ | $l_2$ | $l_3$ | $l_4$ | $l_5$ | $l_6$ | $l_7$ | $l_8$ | | |
| $D_1$ | 1 | 1 | 0 | 0 | 0 | 0 | 0 | 0 | 0 | 1 | 1/9 |
| $D_2$ | 1 | 0 | 0 | 0 | 0 | 0 | 0 | 1 | 1 | | 2/9 |
| ... | | | | | | | | | | | ... |

FIG. 19A
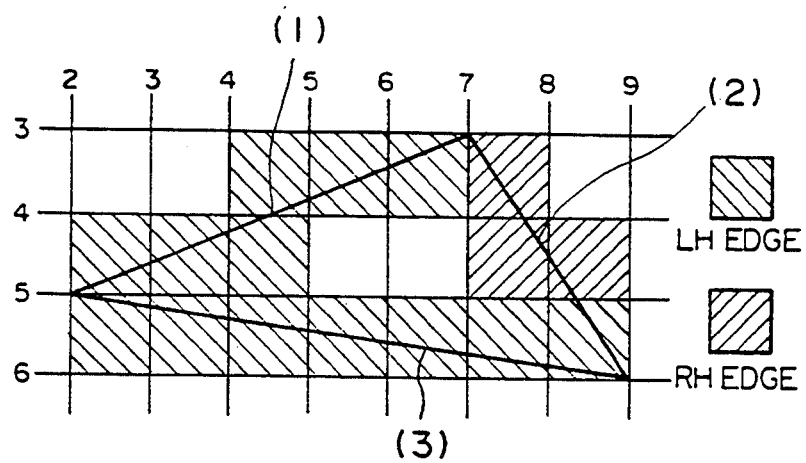
FIG. 19B
FIG. 19C
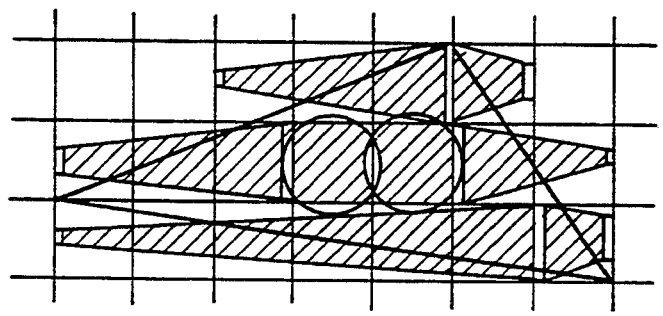

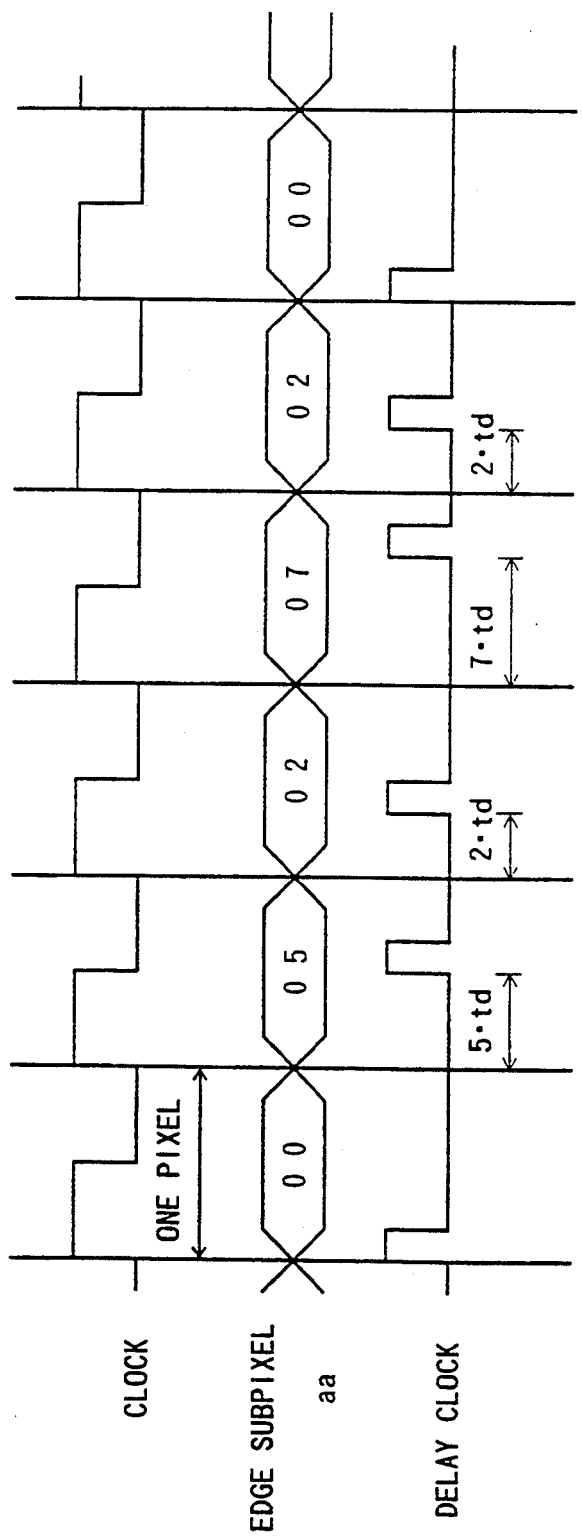

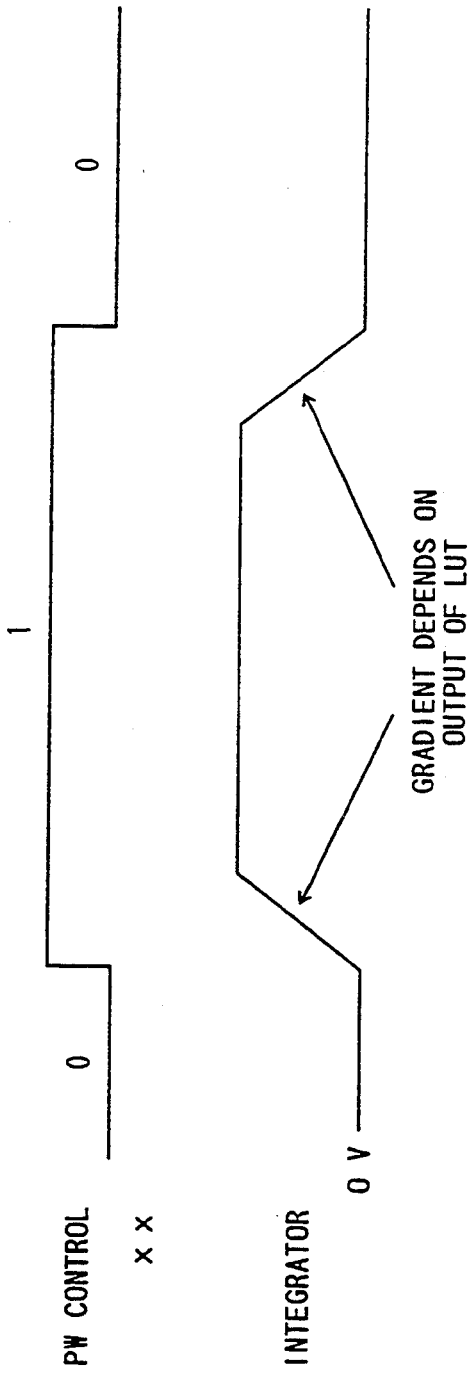

FIG. 39A
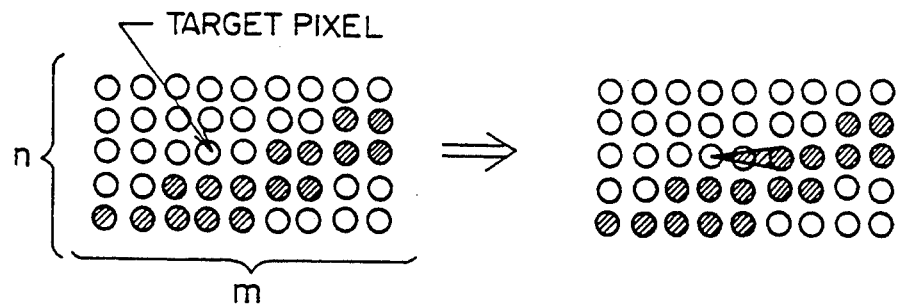
$(m, n > 0)$
FIG. 39B
FIG. 39C
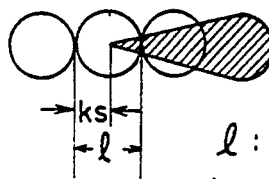
$\ell$ : DOT DIAMETER
ks: START POINT OF BEAM PW MODULATN
$(0 \leq ks < \ell)$
FIG. 40A
FIG. 40B
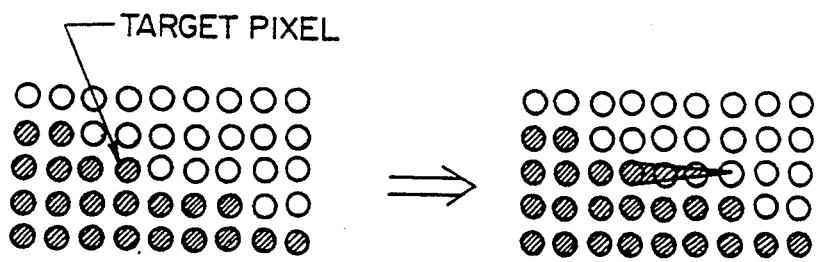
FIG. 40C
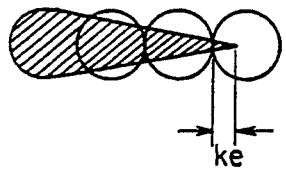
ke: END POINT OF BEAM PW MODULATN

BEAM PW MODULATN STARTS
BEAM PW MODULATN ENDS
INTERMEDIATE PIXELS

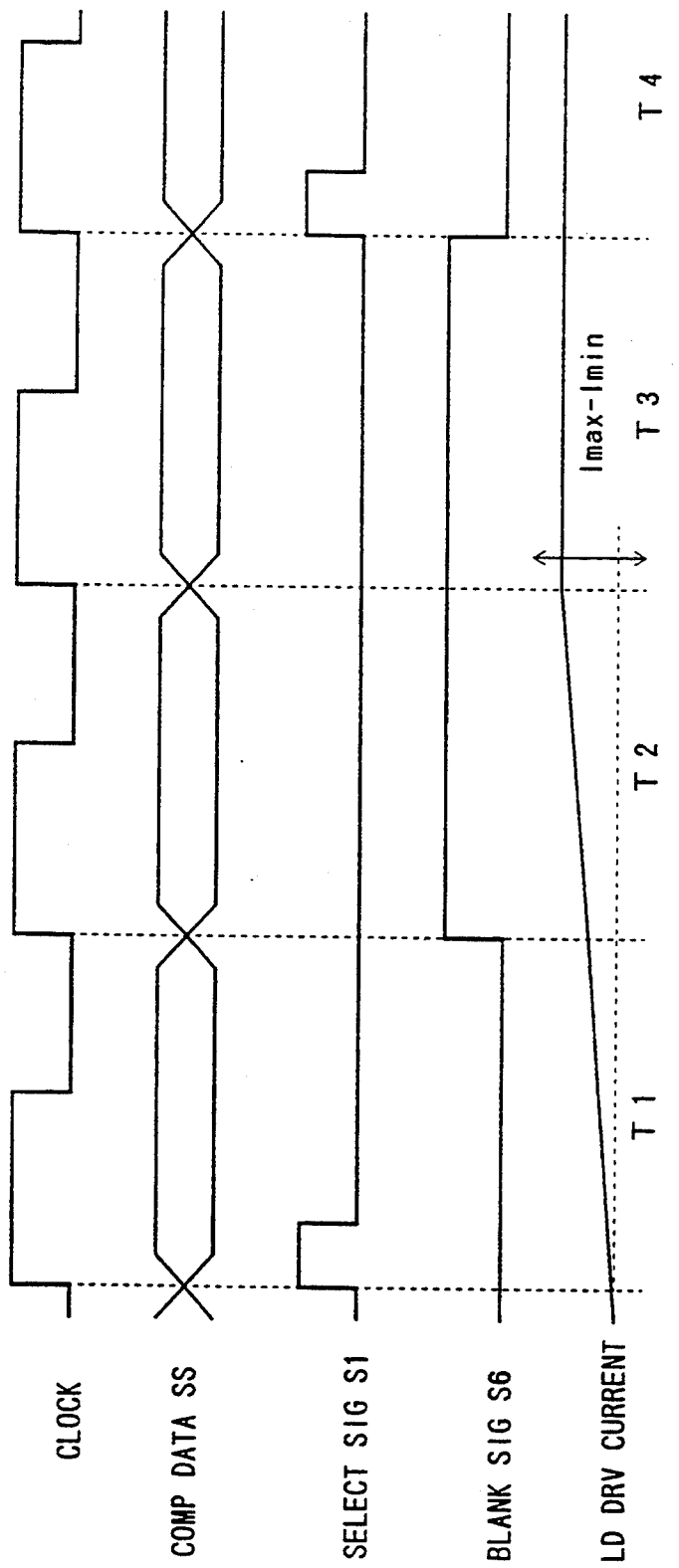

GRAPHICS PROCESSING APPARATUS FOR SMOOTHING EDGES OF IMAGES

BACKGROUND OF THE INVENTION

The present invention generally relates to a graphics processing apparatus, and more particularly to a graphics processing apparatus in which an antialiasing process is carried out in order to smooth edges of an output image by eliminating irregularities or aliases at edge portions of the output image.

In computer graphics systems, an antialiasing technique is used to smooth edges of an output image when the image is output to a cathode ray tube (CRT) display device or a printer connected to a personal computer, so that the output image having smooth edges can be seen on the CRT display screen or the printed sheet. When an antialiasing process is performed with respect to an image to be processed, a luminance or intensity of each dot at edges of the image is modulated and staircase-like irregularities (or, aliases) at the edge portions of the image as shown in FIG. 1A are eliminated so as to create visually smooth edge portions of the image as shown in FIG. 1B. In the prior art, there are several kinds of antialiasing techniques for performing an antialiasing process with respect to an image to be processed. The antialiasing techniques include the averaging technique, the filtering technique, the prefiltering technique and so on. These antialiasing techniques are described in detail in the copending U.S. patent application Ser. No. 680,697 filed on Apr. 4, 1991 having been assigned to the assignee which is the same as that of the present invention. The disclosure of this application is hereby incorporated in the present specification explicitly by reference.

With the recent development of a desktop publishing (DTP) system utilizing a personal computer, it is possible to print out a computer graphic image described by vector data. One of such DTP systems is the PostScript system of Adobe Co. The PostScript is a kind of programming language known as the Page Descriptor Language (PDL). This programming language is used to describe a picture or graphics image of a page and define the arrangement of image data of that page, including the style and format of the text region and the graphics region within the page. In this DTP system, vector font data is used instead of a character font used in the ordinary image processing system. The image output by the above described DTP system can have better quality than the quality of an image output by a conventional wordprocessor using dot matrix format. Also, the DTP system has an advantageous feature in that a composite image in which a text image and a graphics image coexist can be easily and smoothly processed and output to a CRT display or a laser printer.

When a laser printer for outputting an image with a relatively low resolution of 200 dpi to 400 dpi is used, there is a problem in that the effects of aliasing appear at edges of a graphics image output by the laser printer. It is desirable to eliminate the aliases from the edges of such an image, and to produce a high quality image by using an improved antialiasing process. In the cases of the existing image processing systems, the antialiasing process, which is time-consuming and complicated, must be performed in order to determine an approximate area factor or a luminance level per pixel in the image to be processed. It is difficult for the above mentioned apparatus to smoothly increase the speeds of the antialiasing and printing processes at a low cost. Especially when the prefiltering technique is used, it is necessary to perform many computation steps, and the computation steps highly depend on the process of producing a number of subpixels from a pixel. Thus, it is difficult to carry out a fast, efficient graphics processing by means of the existing graphics processing systems.

In addition, Japanese Laid-Open Patent Publication No. 2-112966 discloses an apparatus for performing an antialiasing process so that a high quality image is output to a display unit. In this apparatus, after bi-level image data described in dot matrix format is received, the bi-level image data is grouped into a plurality of small blocks, a pattern matching is performed with respect to each block, and an antialiasing process is performed with respect to each pixel of a target block so as to improve the picture quality of the image. However, a luminance level for a pixel of the image is selected from among intermittent luminance levels, and it is difficult to prevent the luminance level of the image from being discontinuous with respect to some successive pixels of the image. Also, the results of the antialiasing process are not effective.

SUMMARY OF THE INVENTION

Accordingly, it is a general object of the present invention to provide an improved graphics processing apparatus in which the above described problems are eliminated.

Another, more specific object of the present invention is to provide a graphics processing apparatus in which the number of pixels to be processed in an antialiasing process is reduced so that an image with smooth edges is efficiently produced without sacrificing continuity with respect to successive pixels of the image. Still another object of the present invention is to provide a graphics processing apparatus in which a fast, efficient antialiasing process is carried out without any need to compute the approximate area factors, so that an image with smooth edges is generated without sacrificing the image continuity. A further object of the present invention is to provide a graphics processing apparatus in which a high quality image is generated from a dot matrix format image data without sacrificing the continuity of the image. The above mentioned objects of the present invention are achieved by a graphics processing apparatus which includes a first detection part for detecting, with respect to each pixel of an image, whether or not an edge of the image starts on a scanline when each scanline of the image is scanned, and for setting a control data depending on whether or not the edge of the image starts on the scanline, a second detection part for detecting a duration of beam power modulation corresponding to a plurality of edge pixels of the image on the scanline, the edge pixels being intersected by a vector line defined by vector data of the image, and for setting a duration data indicating the duration of beam power modulation, a third detection part for detecting an outermost edge pixel in the edge pixels on the scanline, a part for generating a beam power data indicating an intensity level of light beam power corresponding to the outermost edge pixel detected by the third detection part, an output part for outputting the image for each scanline by using a printer having a light source for emitting a light beam, and a control means for continuously modulating light beam power of the light source from the intensity level indicated by the beam power data to a predetermined level with respect to the edge pixels on the scanline, so that an image with smooth edges is generated by performing the light beam power modulation in accordance with the control data and the duration data.

According to the present invention, it is possible to efficiently output an image with smooth edges and to prevent the intensity level of the output image from being discontinuous with respect to some successive pixels of the image due to the beam power modulation.

Other objects and further features of the present invention will become apparent from the following detailed description when read in conjunction with the accompanying drawings.

BRIEF DESCRIPTION OF THE DRAWINGS

FIG. 2 is a block diagram showing an image forming system to which an embodiment of a graphics processing apparatus according to the present invention is applied;

FIGS. 4A through 4D are diagrams for explaining an antialiasing process in which an area factor with respect to an edge pixel is determined based on intersections between a vector line and divisional lines and the type of the edge pixel;

FIGS. 19A, 19B and 19C are diagrams for explaining an example of the result of the antialiasing process of the first embodiment;

FIG. 23 is a time chart for explaining operations performed by a delay circuit of the driver of FIG. 22;

FIG. 34 is a time chart for explaining an output of an integrator of the driver of FIG. 27;

FIGS. 39A through 39C are diagrams for explaining an antialiasing process performed by the apparatus of FIG. 38;

FIGS. 40A through 40C are diagrams for explaining an antialiasing process performed by the apparatus of FIG. 38;

FIG. 44 is a time chart for explaining operations performed by the compensation signal generator of FIG. 42.

DESCRIPTION OF THE PREFERRED EMBODIMENTS

Figure 1B:
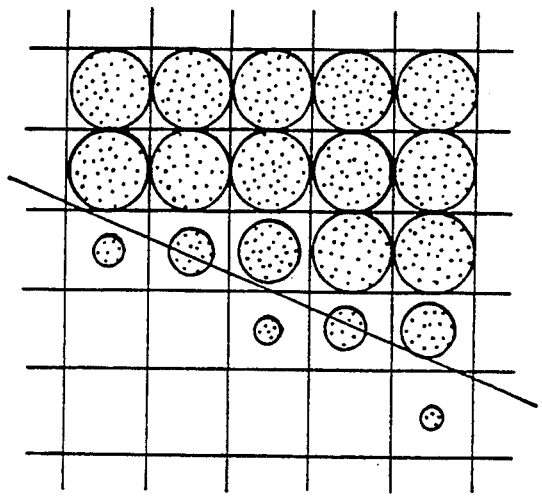
FIG. 1A and 1B are a diagram for explaining an antialiasing process performed by a conventional image processing apparatus.
Figure 1A:
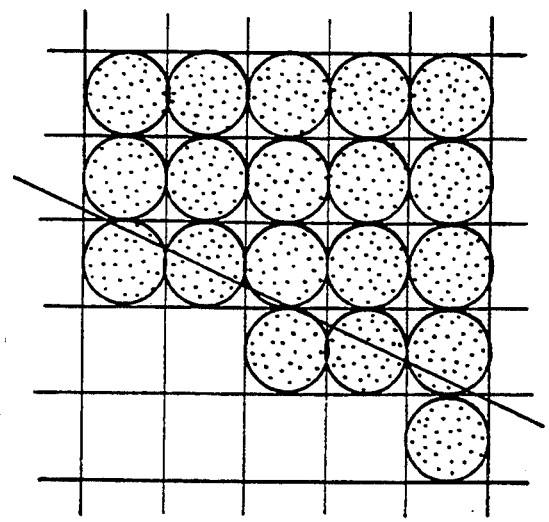

A description will now be given of a first embodiment of a graphics processing apparatus according to the present invention. In the following, the construction of an image forming system to which the present invention is applied, a general explanation of an antialiasing process, construction and operations of a PDL controller, a multilevel image signal generating process when an antialiasing process is performed by means of a laser diode driver, and an example of the result of the antialiasing process performed according to the present invention will be described respectively.

FIG. 2 shows the construction of the image forming system to which the present invention is applied. In this image forming system, a vector data described in Page Description Language (PDL) supplied by a DTP system or an image data read out by an image reader unit from an original document is subjected to antialiasing or other graphics processing and outputting processes. As shown in FIG. 2, this image forming system includes a host computer 100, a PDL controller 200, an image reader 300, an image processor 400, a color laser printer 500 and a system controller 600. The host computer 100 supplies a document data described in PDL language (e.g., the PostScript) of each page of the original document. The PDL controller 200 performs an antialiasing process with respect to the PDL language image data for each page supplied by the host computer 100 and generates three primary color images of red, green and blue (RGB) from the supplied image data. The image reader 300 reads out image data from a document through scanning by an optical scanning unit. The image processor 400 performs several image processing steps with respect to image data supplied by the PDL controller 200 or the image reader 300. A detailed description of the image processes performed by the image processing part 400 is disclosed in the above mentioned copending application, and the disclosure thereof is incorporated in the present specification. The color laser printer 500 carries out a printing of a multilevel tone image data output by the image processor 400. The system controller 600 controls synchronous operations of the PDL controller 200, the image reader 300, the image processor 400 and the color laser printer 500.

Next, a description will be given of the antialiasing process according to the present invention. In the case of the conventional antialiasing techniques, a pixel at an edge of an image to be processed is divided into a plurality of subpixels (e.g. 49 subpixels per pixel), and the number of subpixels being segment painted or shaded must be computed to determine a luminance level of a corresponding pixel of an output image or an area ratio of painted subpixels relative to that pixel. Such computation steps are time consuming and expensive, and it is difficult to achieve a low cost and a speedy computation in the conventional apparatus. According to the present invention, it is possible to perform a fast, accurate computation of an area factor with respect to each of the pixels at the edges of an image without the need to perform the subpixel division and the segment painting.

Referring to FIGS. 3 and 4, an improved antialiasing process according to the present invention will now be explained. In this antialiasing process, an area factor is predetermined from edge data based on the type of edge pixels and from intersection data based on values of coordinates of intersections between a vector line and divisional lines, with respect to pixels at edges of an image described by vector data.

Figure 3A:
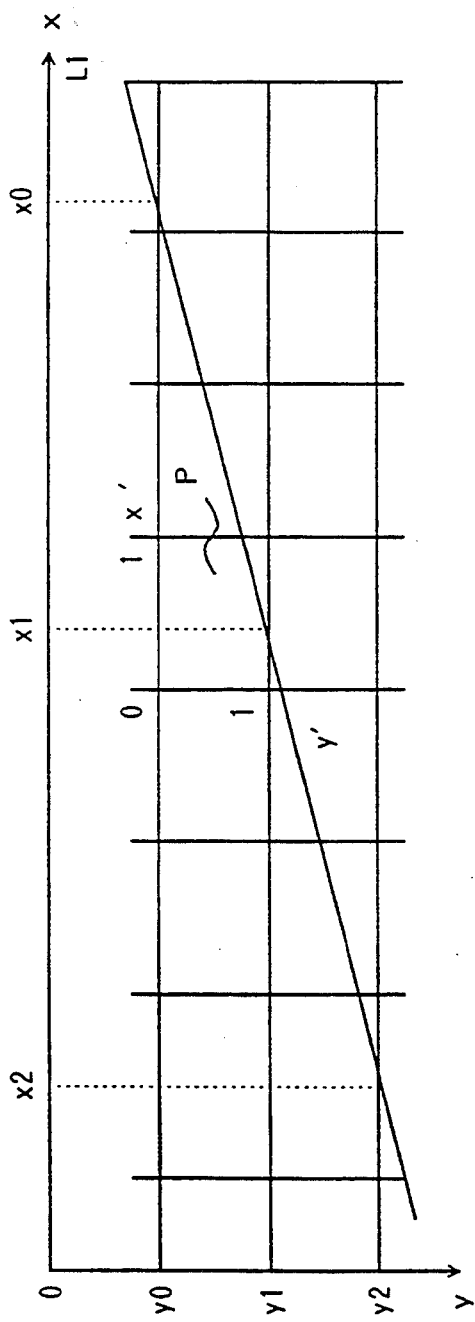
FIGS. 3A and 3B are diagrams for explaining a process of determining an area factor with respect to an edge pixel in an antialiasing process of the present invention.

In FIG. 3A, there are three intersecting points (values of x coordinates: x0, x1, x2) between a vector line L1 (which is defined by vector data) and three scanlines y0, y1, y2 (which are perpendicular to a sub scanning direction). This vector line L1 is represented in x-y coordinate axes by the following equation.

$$y - y0 = [(y1 - y0)/(x1 - x0)](x - x0) \quad (1)$$

In this formula, the vector line L1 is represented based on the two intersecting points (x0, y0) and (x1, y1) as shown in FIG. 3A. With respect to a target pixel P at an edge of an image, a set of four vertical lines 11 through 14 and a set of four horizontal lines 15 through 18 (or referred to as divisional lines 11 through 18) are given in $x'-y'$ coordinate axes so as to check for the presence of intersections between the vector line and such divisional lines, and the target pixel P is divided into 9 subdivisions by these divisional lines. These eight lines are represented in $x'-y'$ coordinate axes by the following equations.

$$11{:}x=0,\ 12{:}x=\tfrac{1}{3},\ 13{:}x=\tfrac{2}{3},\ 14{:}x=1,\ 15{:}y=0,\ 16{:}y=\tfrac{1}{3},$$
$$17{:}y=\tfrac{2}{3},\ 18{:}y=1 \quad (2)$$

Figure 3B:
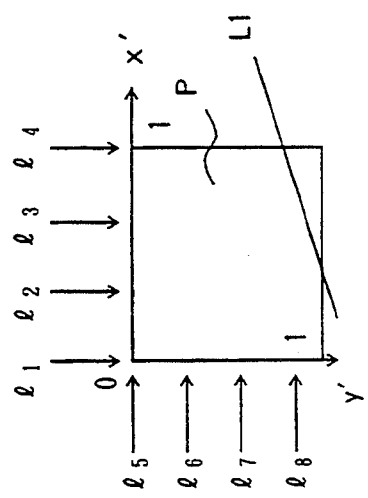

The vector line L1 of FIG. 3B, for example, is represented by the equation: $y = -(\tfrac{1}{3})x + 7/6$ (according to the above equation (1)). The values of x and y coordinates of intersections between the vector line L1 and the divisional lines 11 through 18 in FIG. 3B are indicated in $x'-y'$ coordinate axes as follows.

11:(0, 7/6), 12:($\tfrac{1}{3}$,19/18), 13:($\tfrac{2}{3}$,17/18), 14:(1,5/6), 15:(7/2,0), 16:(5/2,1/3), 17:(3/2,$\tfrac{2}{3}$), 18:($\tfrac{1}{2}$,1)

In $x'-y'$ coordinate axes of FIG. 3B with respect to the target pixel P, the values of the coordinates of intersecting points within the target pixel P must fall into a range of $0<x'<1$, $0<y'<1$. Thus, there are three intersections between the vector line L1 and the divisional lines 13, 14 and 18. Conversely, if the vector line has intersections with the three lines 13, 14 and 18 only, the intersections with respect to the pixel P must lie on either a line segment ($\tfrac{1}{3}<x'<\tfrac{2}{3}$, $y'=1$) or a line segment ($x'=1$, $\tfrac{2}{3}<y'<1$). It can be readily understood that the area factor of the target pixel P can be approximated to a certain value if the divisional lines and the vector line between which intersections exist are uniquely determined. Hence, the area factors can be determined based on the edge data and the intersection data, and such an antialiasing process is applied to the present invention.

FIG. 4B shows an example of an LUT (lookup table) for generating an area factor from the intersection data and the edge data. FIG. 4A is an enlarged view of the vector line L1 of FIG. 3B. In this LUT, edge flags representing edge data, line flags representing the intersection data, and an area factor to be assigned to a pixel are stored.

If a left-hand edge flag is 1 and a right-hand edge flag is 0, a left-hand edge pixel is indicated. If the left-hand edge flag is 0 and the right-hand edge flag is 1, a right-hand edge pixel is represented. If both the left-hand edge flag and the right-hand edge flag are 1, a vector line such as shown in FIG. 4C is indicated. When any of the line flags is 1, it is indicated that an intersection between a vector line and a corresponding divisional line exists. A data sequence D1 of the LUT represents the vector line such as that shown in FIG. 4C, and includes an area factor corresponding to a shaded portion of FIG. 4C. Similarly, a data sequence D2 of the LUT represents a line such as that shown in FIG. 4D, and includes an area factor corresponding to a shaded portion of FIG. 4D. In the antialiasing process of the invention, in order to calculate an area factor with respect to a pixel and a vector line as shown in FIG. 4C, intersections between the vector line and the divisional lines are detected so as to produce the intersection data. Also, it is detected whether the target pixel is a left-hand edge or a right-hand edge, so as to produce the edge data. Thus, an area factor can be generated, by means of the above described LUT, from the edge data and the intersection data.

Figure 5A:
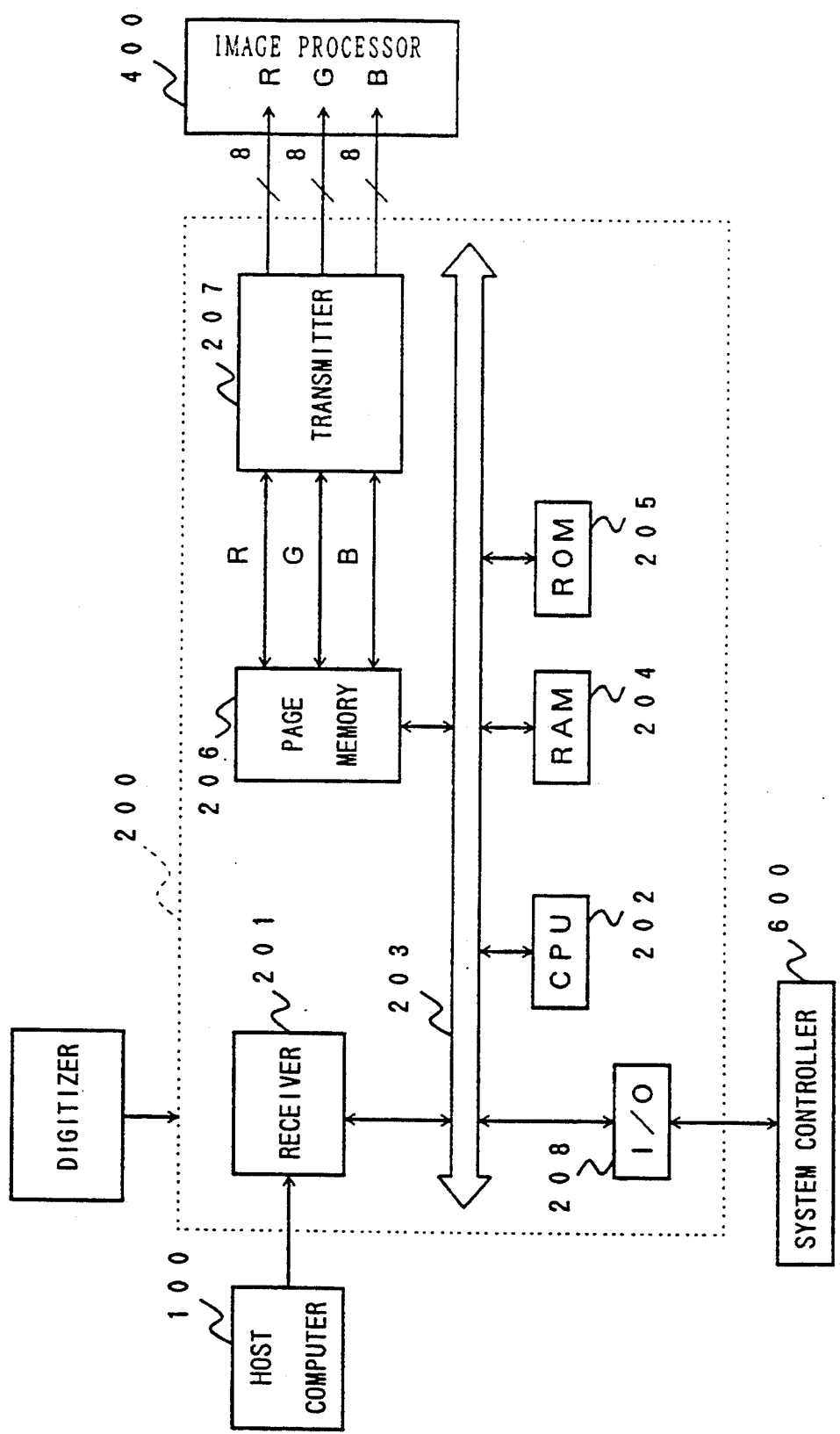
FIGS. 5A and 5B are block diagrams showing the construction of a PDL controller in the image forming system.

FIG. 5A shows the construction of the PDL controller 200 according to the present invention. This PDL controller 200 includes a receiver unit 201, a central processing unit (CPU) 202, an internal system bus 203, a random access memory (RAM) 204, a read only memory (ROM) 205, a page memory 206, a transmitter unit 207, and an input/output interface unit 208. The receiver unit 201 of this PDL controller 200 receives image data described in PDL language from the host computer 100 for each page. The image data, received by the receiver unit 201, is transferred to the RAM 204 via the system bus 203. The CPU 202 controls storage of the received image data of each page in the RAM 204, and performs an antialiasing process with respect to the image data in the RAM 204. A control program for executing the antialiasing process for image data and the other control programs is stored in the ROM 205. A multilevel RGB color image data produced after the antialiasing process is performed is stored in the page memory 206. The three primary color image data of red, green and blue generated as the result of the antialiasing process are respectively stored in a corresponding memory part of the page memory 206. The transmitter unit 207 transfers the multilevel RGB color image data, with respect to each of the three primary color data, stored in the page memory 206 to the image processor 400. The I/O interface unit 208 is used for exchanging control signals between the PDL controller 200 and the system controller 600.

Figure 5B:
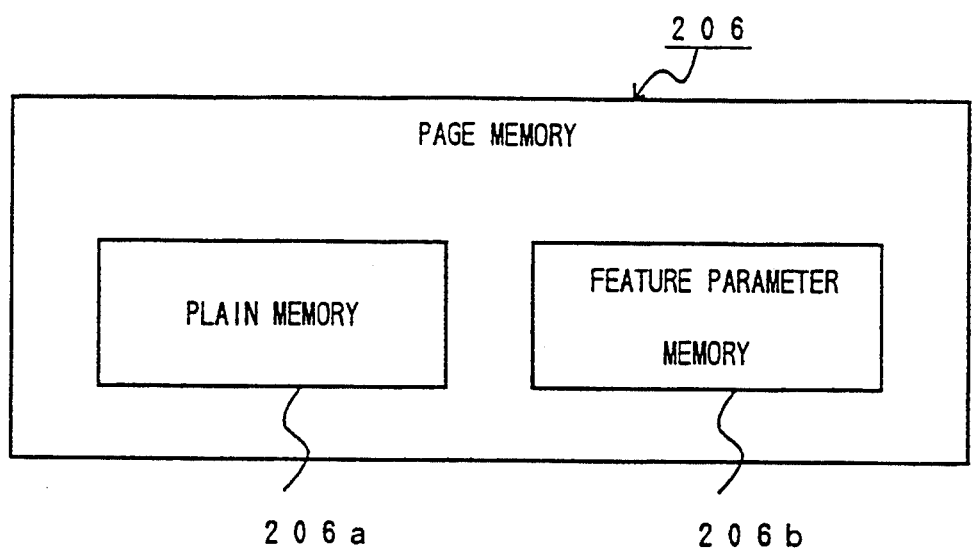

More specifically, the CPU 202 performs the antialiasing process with respect to each page of the PDL image data stored in the RAM 204 by executing the control program stored in the ROM 205. The image data of each page received by the receiver unit 201 is transferred to the RAM 205 via the system bus 203. After the PDL language image data of each page is received by the RAM 204, the CPU 202 performs the antialiasing process with respect to graphic elements within that page in accordance with the flow of several processes which will be described below. After the antialiasing process is performed, a multilevel image data is respectively stored in three plain memory parts of the page memory 206. As shown in FIG. 5B, the page memory 206 includes a plain memory part 206a and a feature parameter memory part 206b with respect to each of the three primary colors of red, green and blue. The multilevel color image data (RGB), with respect to each of the three primary colors of red, green and blue, stored in the page memory 206 is transferred by the transmitter unit 207 to the image processor 400.

Figure 6A:
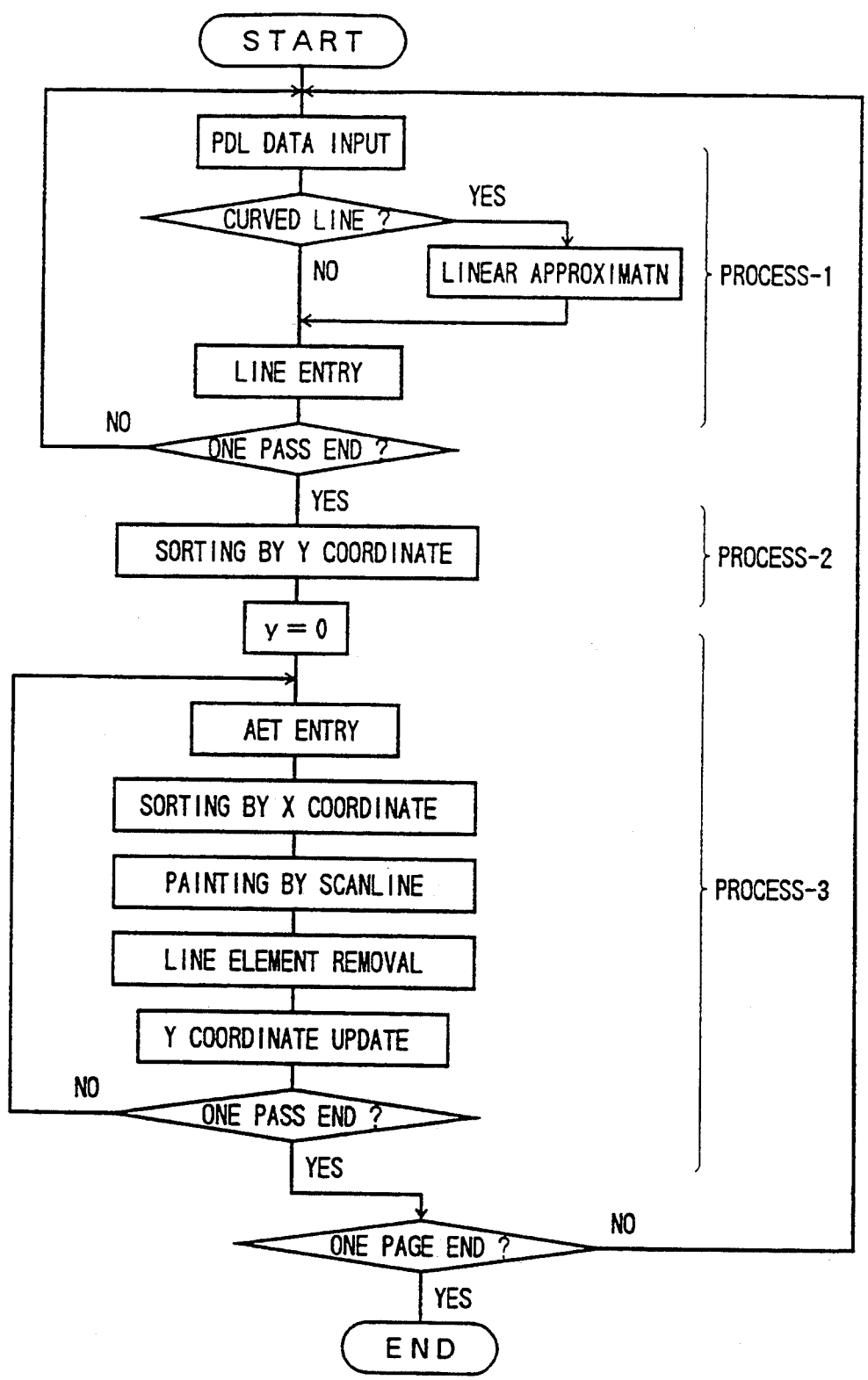
FIGS. 6A and 6B are diagrams for explaining operations performed by the PDL controller.

Next, a description will be given of operations performed by the CPU 202 of the PDL controller 200. FIG. 6A shows a flow of processes performed by the CPU 202 when the antialiasing process is performed with respect to the image data stored in the RAM 204. The antialiasing process is performed for each page of the PDL image data received from the host computer 100. Multilevel color image data is generated with respect to each of the three primary colors of red, green and blue after the antialiasing process is completed. After the image processing is performed by the image processor 400, the multilevel color image is supplied to the color laser printer 500.

The PDL image data includes a set of vector data describing graphics elements and character elements included in an image to be processed. Generally, one page of the PDL image data contains one or a plurality of passes, and one pass contains one or a plurality of data elements (character elements or graphics elements). In the flow chart of FIG. 6A, when one pass included in the PDL image data is input, each data element included in that pass is checked as to whether or not the data element is a curved line vector. If the data element is a curved line vector, the curved line vector is converted into a linear line vector through linear approximation. Data of the line vector is stored and registered as a line element in a working area. This procedure is repeated until all the data elements included in that pass are processed.

Figure 6B:
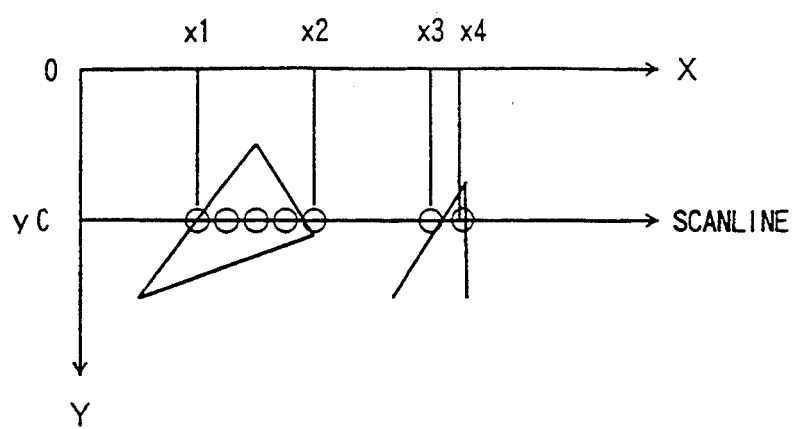

The line vector data is registered in the working area with respect to each pass of the PDL image data. In a process-1 as shown in FIG. 6A, the registering of line elements in the working area is performed as described above. In a process-2, the line elements registered in the working area with respect to each pass are sorted according to the value of a y coordinate of a starting point of each line element. In a process-3, the value of the y coordinate is incremented, and a segment painting is sequentially performed for each scanline. For example, when the segment painting is performed with respect to the pass as indicated in FIG. 6B, values (in real number) of x coordinates of intersections between a scanline "yc" (which has no thickness) and line elements of the image are detected in x-y coordinate axes, and they are registered into an Active Edge Table (AET). This AET is stored in the RAM 204. In this example, the intersections (or edge pixels) are indicated by x coordinates x1, x2, x3 and x4. The intersections are located at edges of the image at which the scanline "yc" intersects the line elements of the image.

Generally, the order of line elements being registered into the AET is not necessarily the same as the order of the values of x coordinates of the intersections. Thus, the line elements in the AET are sorted according to the ascending order of the values of x coordinates of the intersections after the entry of the line elements into the AET is completed. The segment painting is sequentially performed so as to form a shaded portion of the image between respective two scanlines yc and (yc+1). The antialiasing process is carried out by adjusting the density and luminance of edge pixels in accordance with the area factor when the segment painting is performed. Then, the processed line element is removed from the AET sequentially, and the scanline is updated to a next scanline. The above described procedures are repeated until all the line elements in the AET are processed. Then, the process-1, the process-2 and the process-3 as described above are repeated until all the passes in the page are processed.

Figure 7:
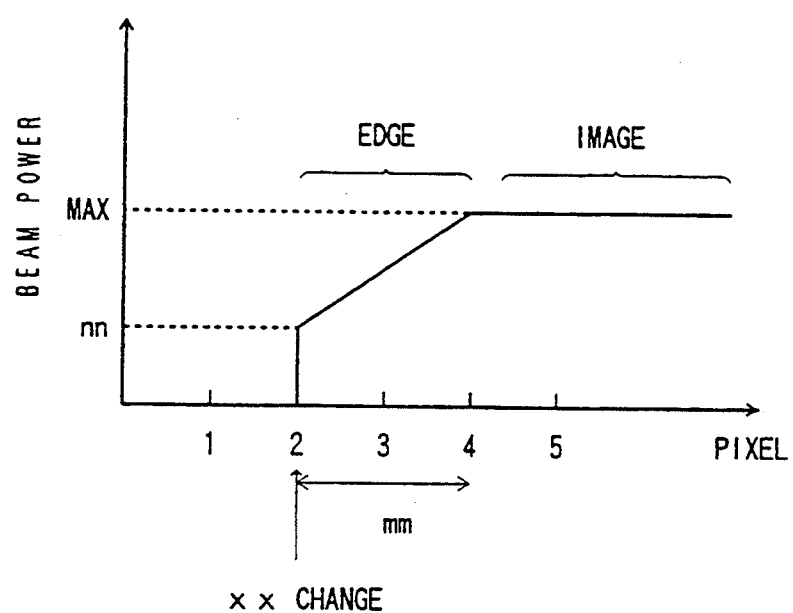
FIG. 7 is a diagram for explaining data necessary for a color laser printer to output an image after an antialiasing process is performed.

After the above described processes are performed by the PDL controller 200, the color image data (RGB) is supplied to the color laser printer 500 via the image processor 400. The multilevel color image data of the edge pixels is output to the color laser printer 500 by continuously modulating the beam power to drive the laser diodes of the color laser printer 500. In order to output an image with smooth edges in which the effects of aliasing are eliminated, the color laser printer 500 of the present invention requires a beam power data "nn" indicating a level of density or luminance of an edge pixel at the start (or end) of beam power modulation, an edge duration data "mm" indicating a duration of the beam power modulation, and a control data "xx" indicating a change of the beam power modulation. FIG. 7 shows such data required by the color laser printer 500 for outputting an image with smooth edges.

Figure 8:
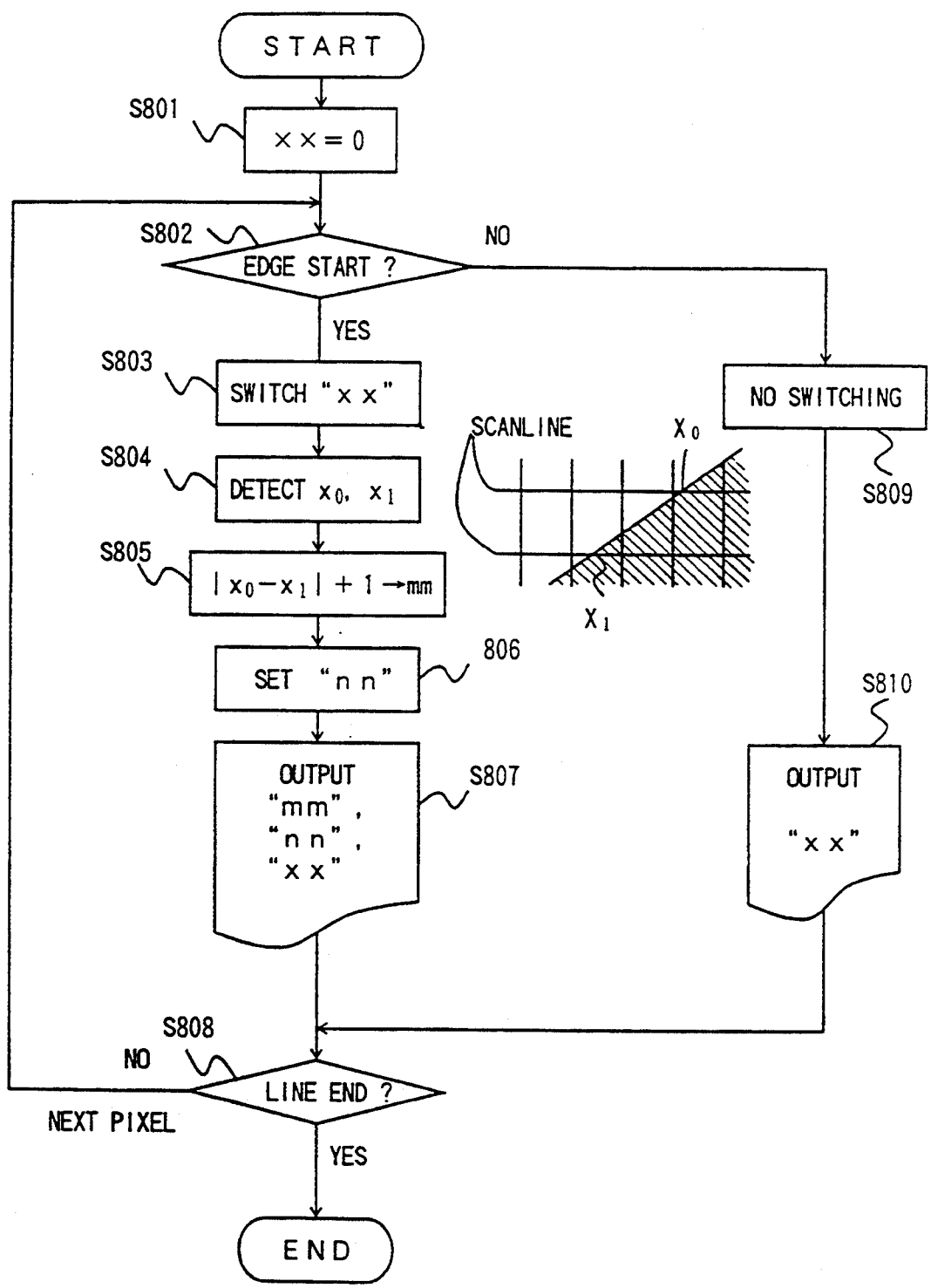
FIG. 8 is a flow chart for explaining an antialiasing process of a first embodiment of the present invention.

FIG. 8 shows a process for generating the data required for printing out an image with smooth edges. Step S801 initially sets the control data "xx" to zero. Step S802 detects whether or not an edge of an image starts on a scanline when each scanline of the image is scanned. If the edge of the image starts on the scanline, step S803 switches the level of the control data "xx" to an opposite level. For example, when the control data "xx" is at a low level "0" it is changed to a high level "1" in step S803 and vice versa. Step S804 detects values of integer portions of x coordinates of intersections (x0, x1) between the vector line and two scanlines. The intersecting point x0 is located nearer to the image portion than the intersecting point x1.

Based on the values of the intersecting points x0 and x1, step S805 calculates a value of the edge duration data "mm" by the formula: $|x0-x1|+1$. This edge duration data "mm" indicates a duration of the beam power modulation. An area factor is automatically determined based on the intersection data and the edge data through the LUT as described above. Based on the area factor, step S806 sets the beam power data "nn". This beam power data "nn" indicates a level of density (selected from among a plurality of density levels) at the start of the beam power modulation, the beam power data corresponding to an edge pixel where the intersecting point x1 exists. Step S807 outputs the edge duration data "mm", beam power data "nn" and control data "xx" to the page memory 206 at a portion thereof corresponding to a target pixel of the image.

Step S808 detects whether or not one scanline of the image ends. If the scanline does not end, the target pixel is shifted to a next pixel of the image on the scanline and the steps S802 through S808 are repeated until the scanline ends. If it is detected in step S802 that an edge of the image does not start on the scanline, step S809 does not switch the control data "xx". The level of the control data "xx" remains unchanged from the previous level in step S809. Step S810 outputs the control data "xx" to the page memory 206 at a portion thereof corresponding to the target pixel. After step S810 is performed, step S808 detects whether or not one scanline of the image ends as described above.

Next, a description will be given, with reference to FIGS. 9A and 9B, of the operation performed by the recording units of the color laser printer 500. For the sake of convenience, a detailed description of the construction and operation of the multilevel color laser printer will be omitted, and the disclosure of the co-pending application mentioned above is hereby incorporated in the specification.

Figure 9A:
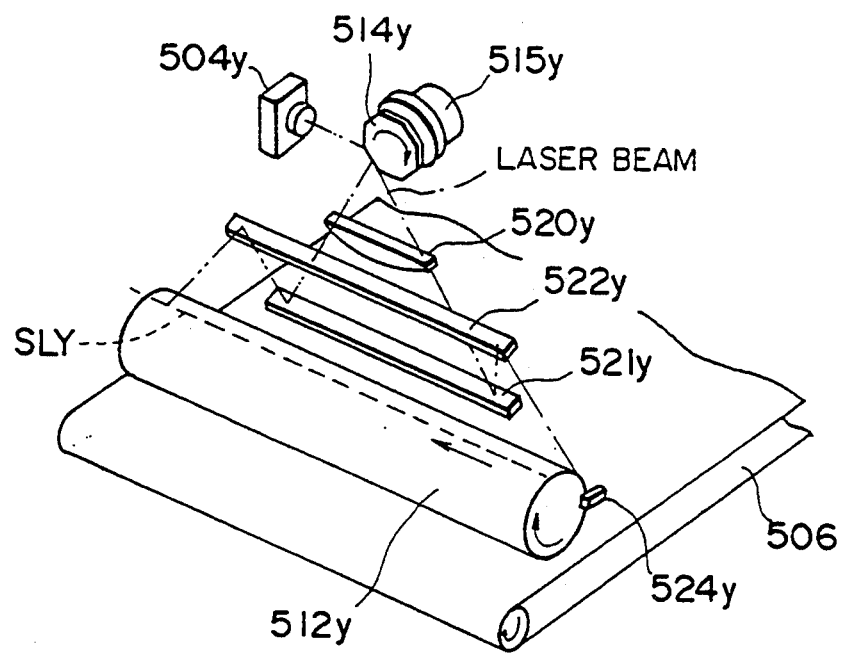
FIGS. 9A and 9B are views showing a recording unit of a color laser printer.

FIG. 9A shows a yellow recording unit YU of the color laser printer. The operations performed by the yellow recording unit when the exposure, development and image transfer processes are performed will be described. A description of the other recording units of the printer 500 is omitted for the sake of convenience. In FIGS. 9A and 9B, a laser beam emitted from a laser diode 504$y$ is reflected on a polygonal mirror 514$y$, and passes through a f-Θ lens 520$y$. This laser beam is further reflected on mirrors 521$y$ and 522$y$, so that the laser beam is irradiated to a photosensitive drum 512$y$ via a dustproof glass 523$y$. The laser beam scans the photosensitive drum 512$y$ along a scanline in a direction parallel to a longitudinal direction of the photosensitive drum as the polygonal mirror 514$y$ is rotated at a constant velocity by a motor 515$y$ in a direction as indicated by an arrow in FIG. 9A. The direction in which the laser beam scans the photosensitive drum 512$y$ is called a main scanning direction, and the photosensitive drum 512$y$ is scanned per scanline by the laser beam in the main scanning direction. As the photosensitive drum 512$y$ is rotated around its longitudinal axis in a direction indicated by an arrow in FIG. 9A, the photosensitive drum 512$y$ is also scanned by the laser beam in a direction perpendicular to the main scanning direction. This direction is called a sub scanning direction.

Figure 9B:
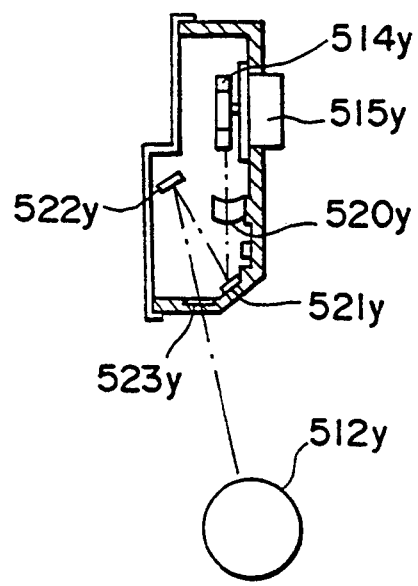

In FIGS. 9A and 9B, a photodetector 524$y$ is provided at a prescribed portion of the photosensitive drum 512$y$ for detecting a reference position of a main scanline in the main scanning direction. The laser diode 504$y$ is driven so as to emit a laser light beam in accordance with a 3-bit recording data supplied by the image processor 400. A multilevel gradation image (with respect to yellow) is recorded on the photosensitive drum 512$y$ in accordance with the 3-bit recording data through exposure to the laser beam emitted from the laser diode 504$y$. The surface of the photosensitive drum 512$y$ is uniformly charged by a charger (not explicitly shown in FIGS. 9A and 9B), in advance, and an electrostatic latent image corresponding to the output image is formed on the photosensitive drum through exposure to the laser beam. The electrostatic latent image is developed by a yellow toner developer (not explicitly shown in FIGS. 9A and 9B) 516$y$ so as to make a yellow toner image on the photosensitive drum surface. The toner image is formed on a recording sheet as it is transported by sheet transport belt 506.

The construction and operation of a magenta recording unit MU, a cyan recording unit CU and a black recording unit BKU when the exposure, development and image transfer processes are performed are essentially the same as those of the yellow recording unit YU, and a description thereof will be omitted. The black recording unit BKU has a black toner developer for image forming and transferring of a black toner image. The cyan recording unit CU has a cyan toner developer for performing image forming and transferring of a cyan toner image. The magenta recording unit MU has a magenta toner developer for performing image forming and transferring of a magenta toner image. By combining these primary color images together, a color multilevel gradation image is formed on the recording sheet.

Figure 10:
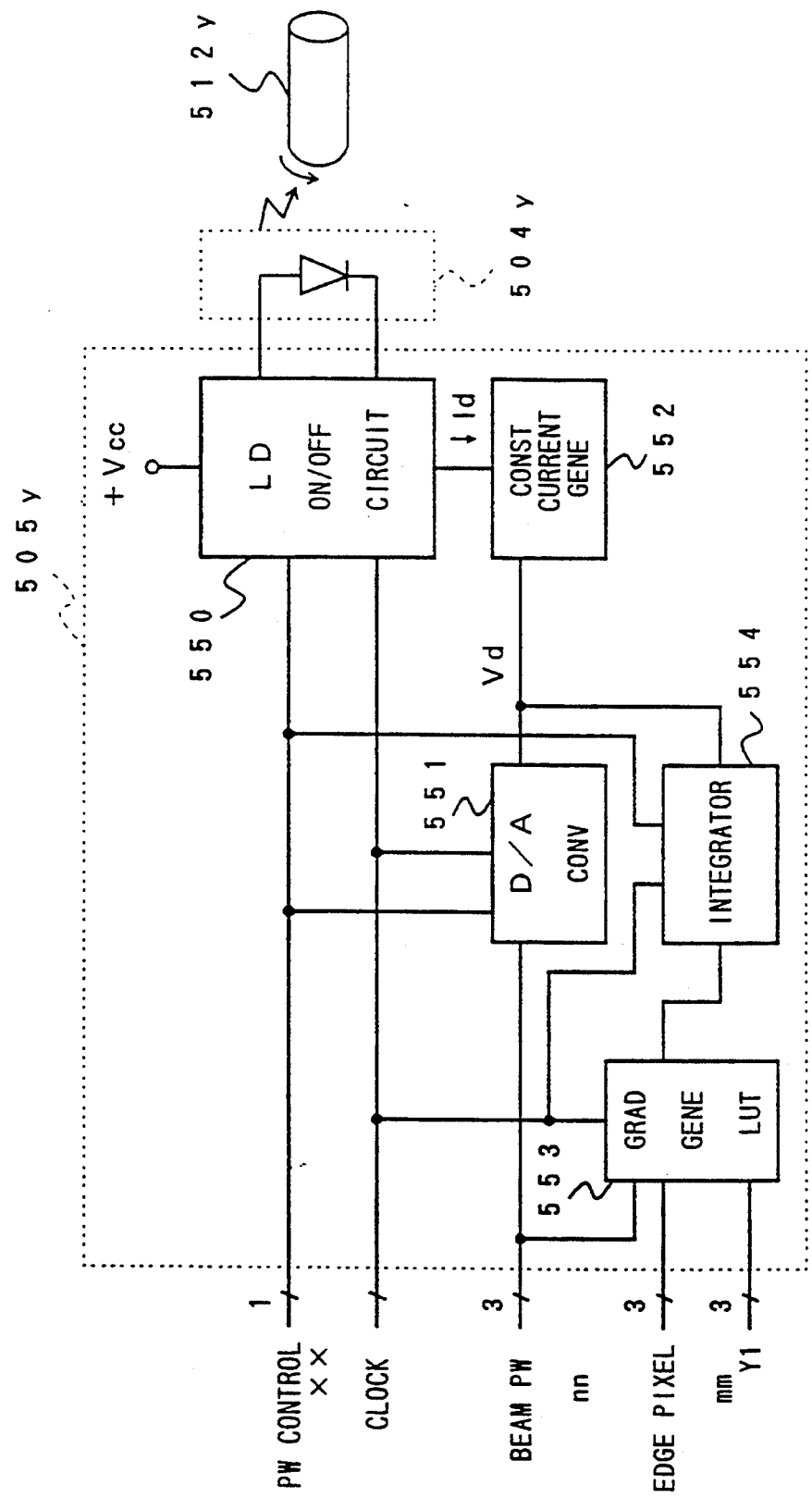
FIG. 10 is a block diagram showing a driver of the recording unit for driving a laser diode which emits a laser beam in accordance with multilevel image data through beam power modulation.
Figure 11:
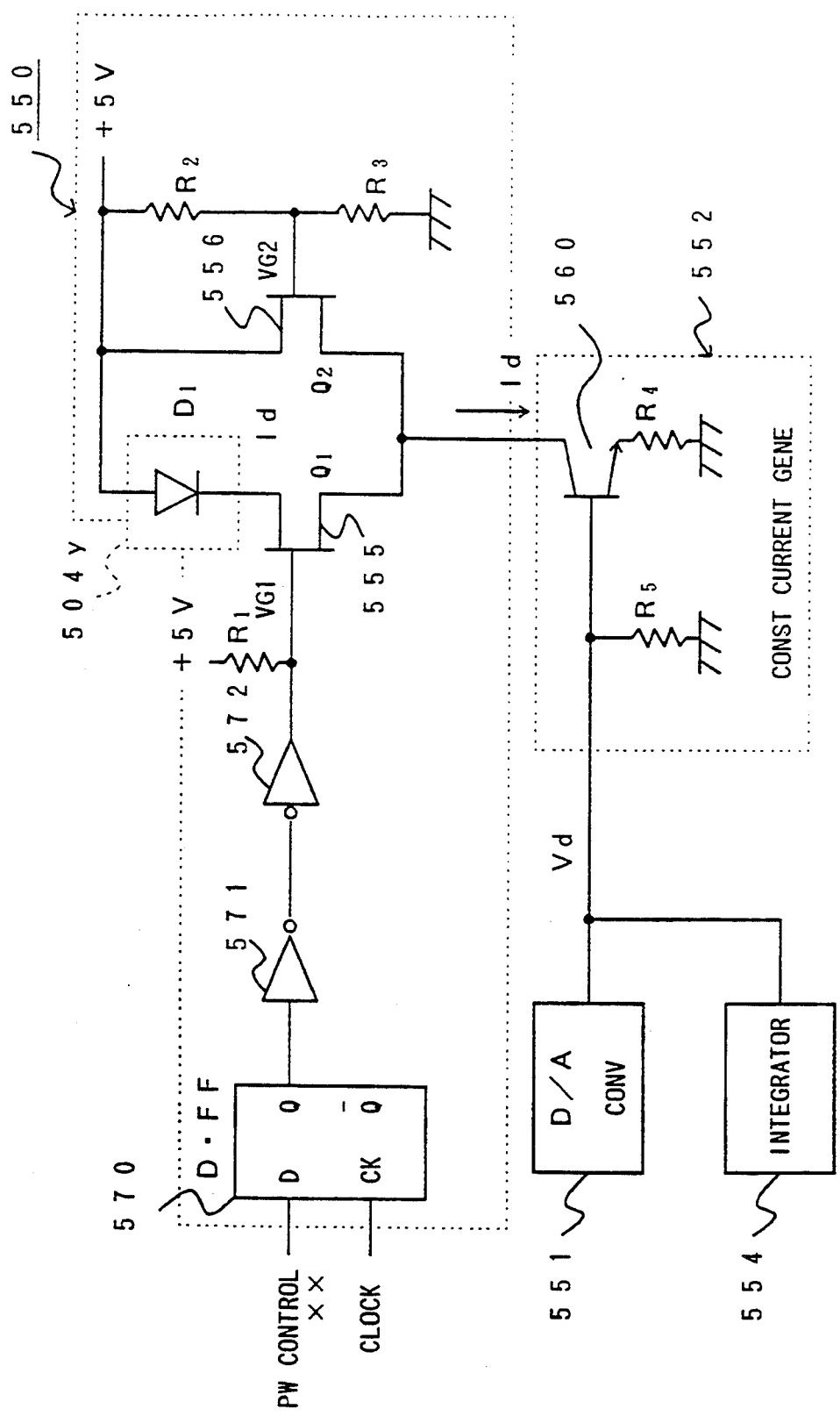
FIG. 11 is a block diagram showing a laser diode on/off circuit and a constant current generator of FIG. 10.

Next, a description will be given of a method of generating a multilevel gradation image by controlling a laser diode driver of the color laser printer 500 (as shown in FIG. 2) through beam power modulation. In the color laser printer 500 according to the present invention, a plurality of drivers (for example, 505y shown in FIG. 10) are provided in order to control the emission of laser beams from respective laser diodes (for example, 504y as shown in FIGS. 9A, 10 and 11) in accordance with 3-bit data signals corresponding to each of the colors yellow, magenta, cyan and black supplied by the image processor 400 (as shown in FIG. 2) for each of the drivers. According to the present invention, in order to enable a continuously modulating power to drive a laser diode so as to emit a laser light beam to the photosensitive drum, the laser beam power modulation is used. For the sake of convenience, only the driver 505y and the laser diode 504y with respect to a yellow image will be described in the following. Since the other drivers and their corresponding laser diodes will have a construction that is similar to that of the driver 505y and laser diode 504y, a description thereof will be omitted.

In FIG. 10, a laser diode on/off circuit 550 in the driver 505y switches the laser diode 504y ON and OFF according to a 1-bit power control data "xx" supplied by the image processor 400 via the page memory 206, in synchronism with a clock signal. The driver 505y also has a digital-to-analog (DA) converter 551 which generates a control voltage Vd from a 3-bit beam power data "nn" supplied by the image processor 400 via the page memory 206. A constant current driver 552 coupled to the D/A converter 551 generates a drive current Id from the control voltage-Vd received from the D/A converter 551. This drive current Id is supplied from the constant current generator 552 to the laser diode on/off circuit 550, and the laser diode 504y is driven in accordance with this drive current Id so as to emit a laser beam to the photosensitive drum 512y. A gradient generator LUT (lookup table) 553 is provided so as to generate a gradient signal which will be described below. An integrator 554 generates an appropriate time constant from the gradient signal output by the gradient generator LUT 553.

FIG. 11 shows the construction of the laser diode on/off circuit 550 and the constant current generator 552. The laser diode on/off circuit 550 includes a D flip-flop 570, two TTL inverters 571 and 572, differential switching circuits 555 (Q1) and 556 (Q2), and a voltage divider having resistors R2 and R3. The differential switching circuits 555 and 556 perform on/off toggle switching actions. The voltage divider generates a voltage VG2 so as to satisfy the following conditions: when the voltage VG2 is lower than a voltage VG1 applied to the circuit 555, the switching circuit 555 is switched ON and the switching circuit 556 is switched OFF, and when VG2>VG1, the switching circuit 555 is switched OFF and the switching circuit 556 is switched ON.

Figure 12:
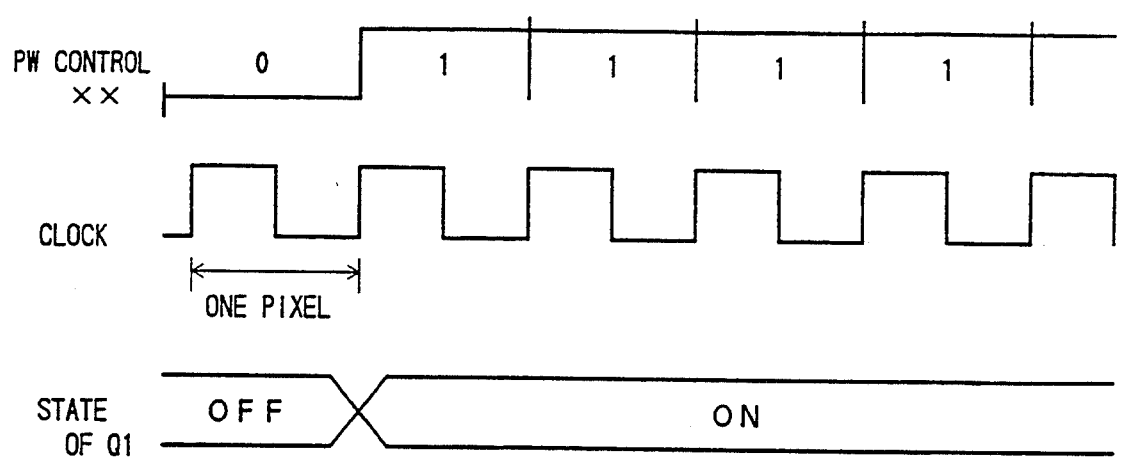
FIG. 12 is a time chart for explaining operations performed by the laser diode on/off circuit of FIG. 10.

FIG. 12 shows operations performed by the laser diode on/off circuit 550. When the output Q of the D flip-flop 570 is at the high level "1" in accordance with the power control signal "xx", the switching circuit 555 (Q1) is switched ON and the switching circuit 556 (Q2) is switched OFF. The current Id flowing through the laser diode 504y is generated by the constant current generator 552.

Figure 13:
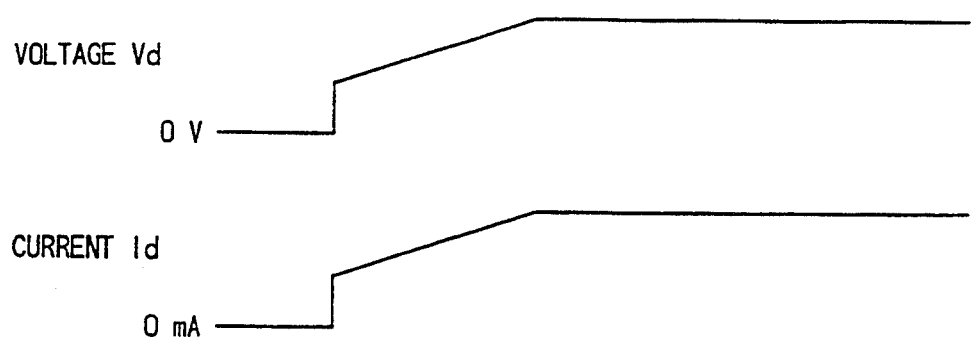
FIG. 13 is a diagram showing the relationship between the control voltage and the laser diode current.

In FIG. 11, the constant current generator 552 includes a transistor 560 and resistors R4 and R5. As described above, this generator 552 generates a drive current Id, and, in accordance with this drive current Id, the laser diode 504y is driven so as to irradiate a laser beam to the photosensitive drum 512y. The control voltage Vd output by the D/A converter 551 is supplied to a base of the transistor 560, to determine a current flowing through the resistor R4. The drive current Id for driving the laser diode 504y is in proportion to the current through the resistor R4. FIG. 13 shows a relationship between the control voltage Vd and the laser diode current Id. In this manner, the current Id flowing through the laser diode 504y is controlled by the control voltage Vd supplied to the transistor 560.

Figure 14:
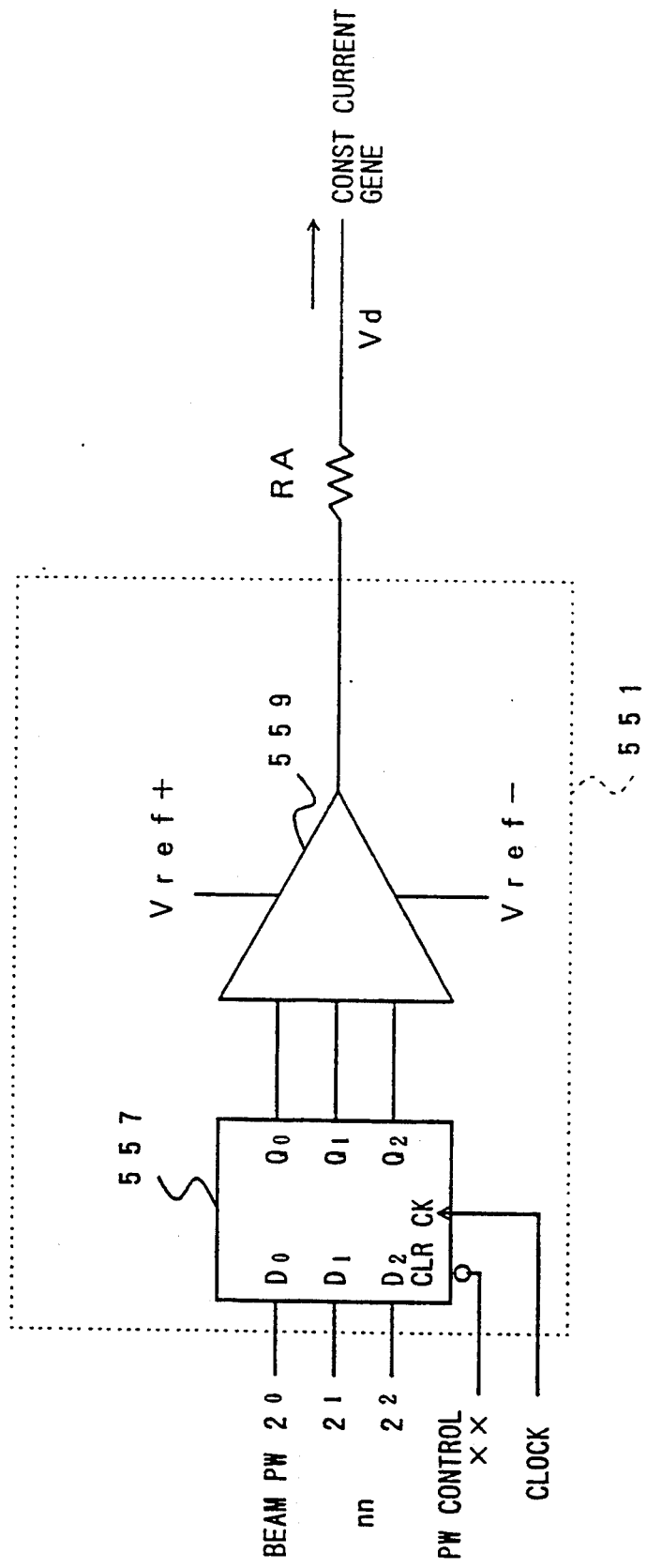
FIG. 14 is a block diagram showing a D/A converter of the driver shown in FIG. 10.
Figure 15:
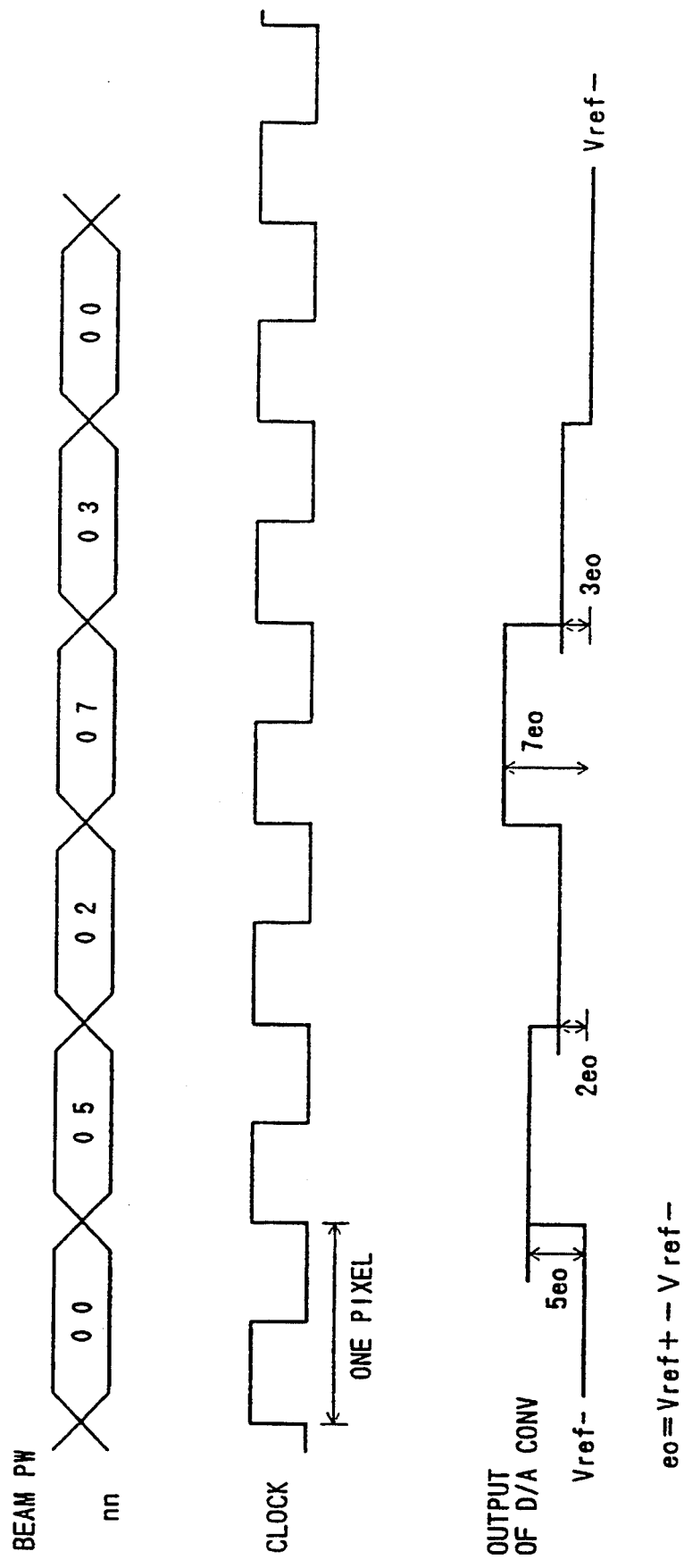
FIG. 15 is a time chart for explaining an output of the D/A converter of FIG. 14.

FIG. 14 shows the construction of the D/A converter 551. In FIG. 14, the D/A converter 551 includes a latch 557 and a 3-bit converter 559. Each time the clock signal changes at a leading edge from the low level "0" to the high level "1", the 3-bit beam power data "nn" is held by the latch 557. The beam power data "nn" held by the latch 557 is input to the 3-bit converter 559. In accordance with the beam power data "nn", a voltage difference between Vref+ and Vref− is converted into a proper voltage, and the converter 559 outputs this voltage. The voltage output by the D/A converter 551 is supplied to the constant current generator 552 via a resistor RA. FIG. 15 shows a relationship between the beam power data "nn", the clock signal, and the D/A converter output. As shown in FIG. 15, the voltage difference e0 between Vref+ and Vref− is divided into a converted voltage in accordance with the level of density indicated by the beam power data "nn". This converted voltage is output by the D/A converter 551.

Figure 16:
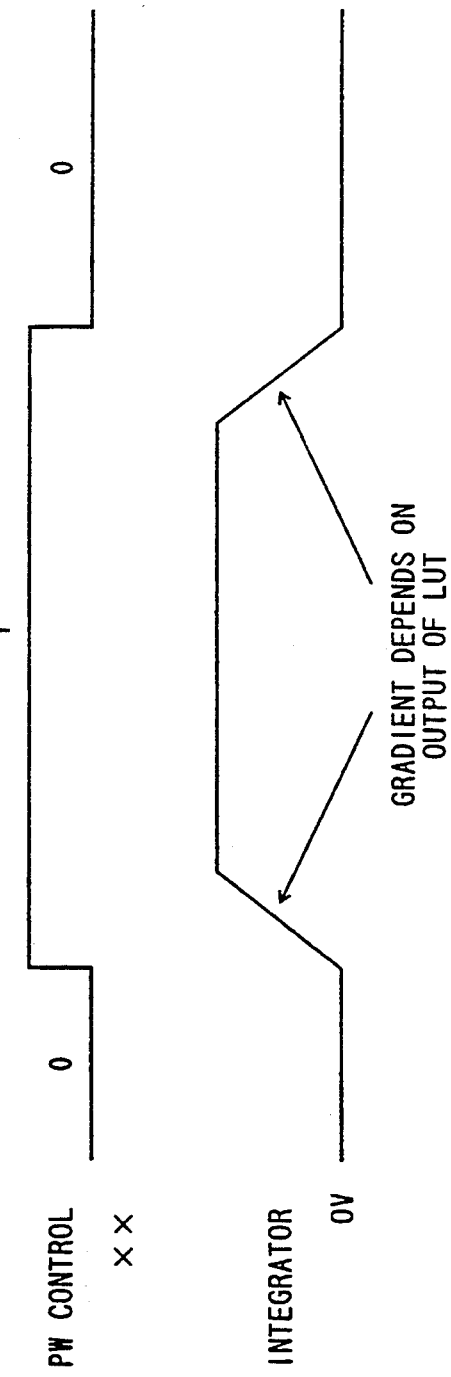
FIG. 16 is a time chart for explaining an output of an integrator of the driver of FIG. 14.

FIG. 16 shows a relationship between the power control data "xx" and the integrator output voltage. The integrator 554 is provided so as to output an integration voltage in accordance with the change of the beam power modulation indicated by the 1-bit control data "xx". As indicated in FIG. 16, a gradient of a waveform of the integration voltage signal output by the integrator 554 (which gradient is either a voltage rising portion of the signal or a voltage falling portion thereof) depends on the gradient signal output by the gradient generator LUT 553. In the gradient generator LUT 553, such a gradient data for determining the gradient of the integration voltage is calculated, in advance, in accordance with the beam power data "nn", the edge duration data "mm" and the 3-bit image gradation data "Y1" received from the image processor 400 as follows.

$$gradient = (Y1 - nn)/mm \quad (3)$$

Figure 17A:
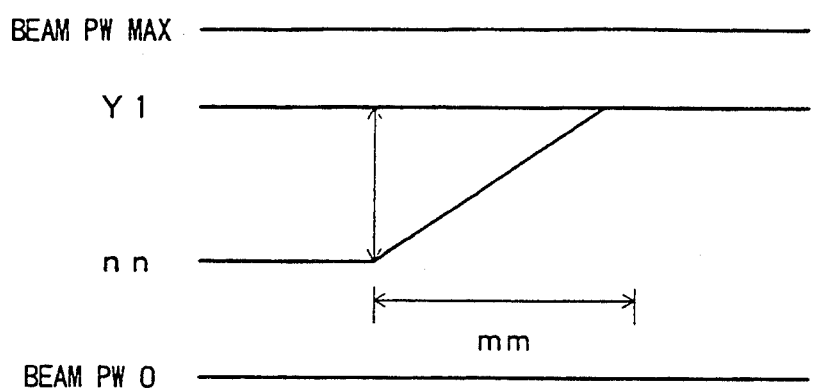
FIGS. 17A and 17B are diagrams for explaining operations performed by a gradient generator LUT of the driver of FIG. 14.

FIG. 17A shows the process of calculating the gradient data output by the LUT 553. The gradient data is calculated according to the formula (3) above. The gradient signal is supplied from the LUT 553 to the integrator 554.

Figure 17B:
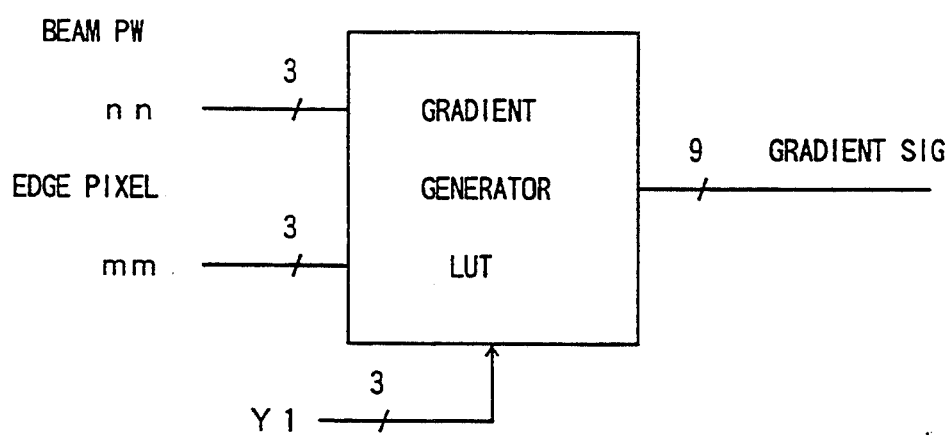

FIG. 17B shows the construction of the gradient generator LUT 553. As shown in FIG. 17B, the beam power data "nn" is a 3-bit data indicating a total of eight levels of the image density, the edge duration data "mm" is a 3-bit data indicating a total of eight values of the duration of the beam power modulation, and the image gradation data Y1 is a 3-bit data indicating a total of eight levels of the image gradation. Thus, the gradient signal output by the gradient generator LUT 553 is a 9-bit data indicating a total of 512 values.

Figure 18:
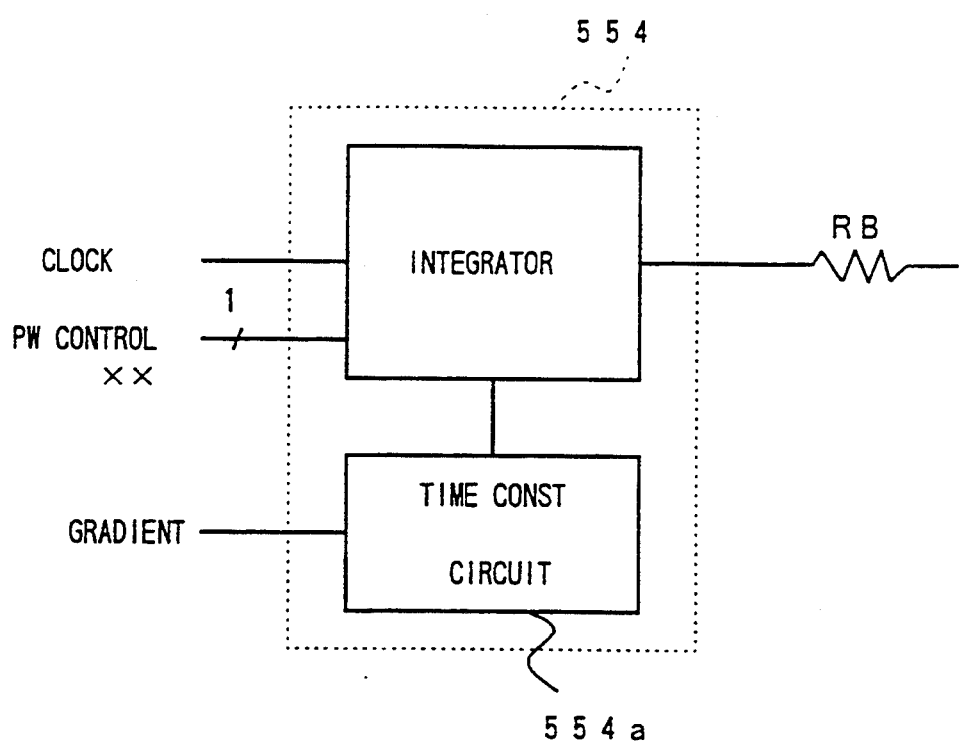
FIG. 18 is a diagram for explaining operations performed by the integrator of FIG. 16.

FIG. 18 shows the construction of the integrator 554. In FIG. 18, the integrator 554 includes a time constant circuit 554a coupled thereto. In this time constant circuit 554a, 512 values of predetermined time constants are pre-recorded. In accordance with the gradient signal received from the LUT 553, an appropriate time constant is selected from among the values of the predetermined time constants and the integrator 554 outputs a signal indicating the selected time constant. In short, the voltage output by the D/A converter 551 via the resistor RA and the voltage output by the integrator 554 via the resistor RB are combined together so as to produce the control voltage Vd, and this control voltage Vd is input to the constant current generator 552 as mentioned above.

Referring to FIGS.19A through 19C, an example of the result of the antialiasing process performed by the graphics processing apparatus of the first embodiment will be described. FIG. 19A shows an image given by a set of vector lines in x–y coordinate axes. A vector line-1 has a start point (7, 3) and an end point (2, 5). A vector line-2 has a start point (7, 3) and an end point (9, 6). A vector line-3 has a start point (2, 5) and an end point (9, 6). In a detection process performed at scanlines at y=3, 4, intersecting points x0 and x1 between the vector line-1 and the two scanlines are detected at x=4.5 and x=7.0, respectively. Also, in this detection process, intersecting points x0 and x1 between the vector line-2 and the two scanlines are detected at x=7.0 and x=7.6, respectively.

In FIG. 19A, for example, there is no edge pixel between the two scanlines at y=3, 4 in a range between x=0 and x=3, and the control data "xx" is set to "0" in that range. An edge pixel exists at x=4 between the scanlines at y=3, 4, and this edge pixel is first detected in the detection process. Thus, the control data "xx" is set to "1" at x=4; the beam power data "nn" is set to "1" at x=4; and the edge duration data "mm" is set to "3" because there are three edge pixels which passes through the vector line-1. Such data is appropriately written to the feature parameter memory part 206a of the page memory 206. The above procedures are repeatedly performed with respect to each scanline.

FIG. 19B shows the contents of the page memory 206 corresponding to the pixels within the range of 1<x<9 and 3<y<5 shown in FIG. 19A. FIG. 19C shows an output image generated in accordance with the data stored in the page memory 206 shown in FIG. 19B. In a case in which both a left-hand edge pixel and a right-hand edge pixel are detected in the same scanline, the data obtained with respect to the left-most edge pixel through the pixel immediately before the right-hand edge (e.g. from x=2 to x=7) is first written onto the memory part 206a, and then the data obtained with respect to the right-hand edge pixel is written onto the memory part 206a.

In the above described first embodiment, it is possible to efficiently output an image with smooth edges by reducing the number of pixels to be processed in the antialiasing process. Also, it is possible to prevent the intensity level of the image from being discontinuous with respect to some successive pixels of the image due to the beam power modulation.

Next, a description will be given of a second embodiment of the graphics processing apparatus according to the present invention. In the second embodiment, a plurality of drivers (for example, 560y shown in FIG. 22) are used in the color laser printer 500 instead of drivers according to 505y of the first embodiment, and with the rest of the construction and operations being similar to those of the first embodiment, a description thereof is thus omitted.

After the PDL controller has performed the prescribed processes, the color image data (RGB) is supplied to the color laser printer 500 via the image processor 400. The multilevel color image data of the edge pixels is output to the color laser printer 500 by continuously modulating the beam power to drive the laser diodes of the color laser printer 500. In the second embodiment, in order to output an image with smooth edges, the color laser printer 500 requires the control data "xx" indicating a change of the beam power modulation, the edge duration data "mm" indicating a duration of the beam power modulation, and an edge subpixel data "aa" indicating a position within a pixel at the actual start of the beam power modulation (0<"aa'-'<1). Such data is produced as the result of the antialiasing process. In accordance with the above data received from the image processor 400 via the PDL controller 200, a laser beam power is continuously modulated in the color laser printer 500 from a minimum power level at an outermost edge pixel to a prescribed reference level in an image portion of the output image. The prescribed reference level is determined based on the 3-bit image data Y1, M1, C1, and BK1 supplied by the image processor 400. Thus, in the second embodiment, it is possible to carry out a fast, efficient antialiasing process without any need to compute the area factors, so that an image with smooth edges is generated without sacrificing the continuity of the image.

Figure 20:
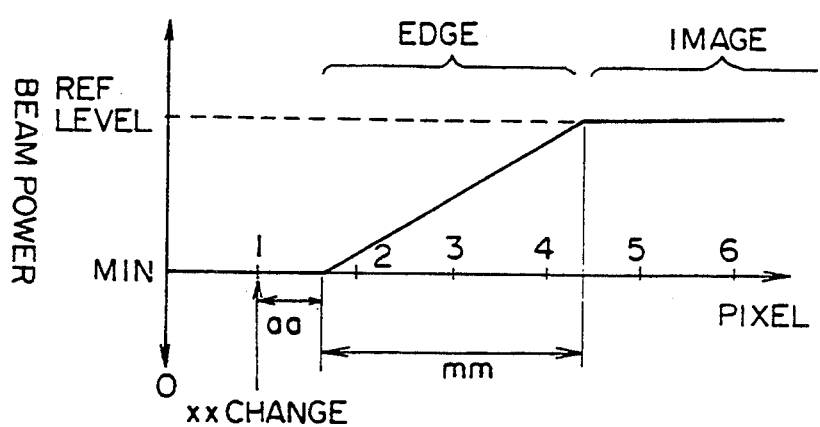
FIG. 20 is a diagram for explaining data necessary for the color laser printer to output an image with smooth edges.

FIG. 20 shows the above described data required by the color laser printer 500 for outputting an image with smooth edges. When the printing process is carried out by means of the color laser printer 500 for outputting edge pixels of an image, a laser beam power is continuously modulated from a minimum power level at an outermost edge pixel to a prescribed reference level in an image portion of the image. The outermost edge pixel (the pixel "1" shown in FIG. 20) at which the beam power modulation changes is indicated by the control data "xx", and the laser beam power is continuously modulated, for the duration indicated by the edge duration data "mm", from the minimum power level at the position within the pixel, which position is indicated by the edge subpixel data "aa", to the prescribed reference level in the image portion of the image.

Figure 21:
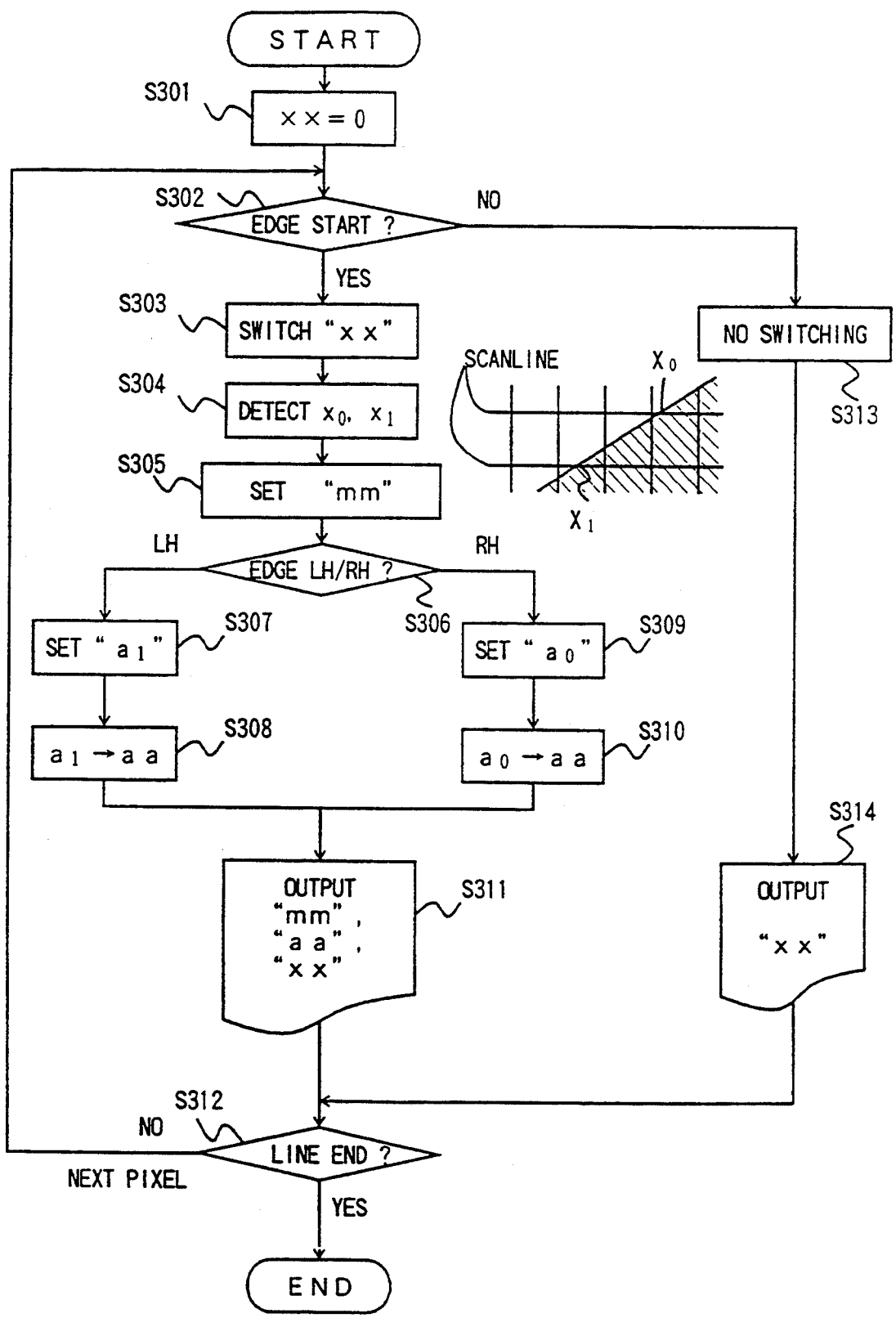
FIG. 21 is a flow chart for explaining a second embodiment of an antialiasing process according to the present invention.

FIG. 21 shows a process of generating the above data required for printing out an image with smooth edges. Step S301 initially sets the control data "xx" to zero. Step S302 detects whether or not an edge of an image starts on a scanline when each scanline of the image is scanned. If the edge of the image starts on the scanline, step S303 switches the level of the control data "xx" to an opposite level. More specifically, when the control data "xx" is at the low level "0", it is changed to the high level "1" in step S303 and vice versa. Step S304 detects values of integer portions of x coordinates of intersections (x0, x1) between the vector line and two scanlines. The intersecting point x0 is located nearer to the image portion of the image than the intersecting point x1.

In accordance with the values of the intersecting points x0 and x1, step S305 calculates a value of the edge duration data "mm". In this calculation, a fraction part of an absolute value of (x0−x1) is converted into a multiple of 1/(n−1): n is the number of gradation levels indicated by the image data. This edge duration data "mm" indicates a duration of the beam power modulation, and is expressed in a multiple of 1/(n−1).

Step S306 detects whether the target pixel (at the intersecting point x1) is a left-hand edge pixel or a right-hand edge pixel. If it is detected as being a left-hand edge pixel, a fraction part of the coordinate value of the point x1 is converted into a multiple of 1/(n−1) in step S307, and a value of this multiple is designated by "a1". Step S308 sets the edge subpixel data "aa" to the value a1. Conversely, if the target pixel is detected as being a right-hand edge pixel, a fraction part of the coordinate value of the point x0 is converted into a multiple of 1/(n−1) in step S309, and a value of this multiple is designated by "a0". Step S310 sets the edge subpixel data "aa" to the value a0. This edge subpixel data "aa" indicates a position within the target pixel so that the beam power modulation can be started. It is expressed in a multiple of 1/(n−1).

Step S311 outputs the data "xx", "mm" and "aa" to the page memory 206 at a portion thereof corresponding to the target pixel. Step S312 detects whether or not one scanline of the image ends. If the scanline does not end, the target pixel is shifted to a next pixel of the image on the scanline and the steps S302 through S312 are repeated until the scanline ends. If it is detected in step S302 that an edge of the image does not start on the scanline, step S313 does not switch the control data "xx". The level of the control data "xx" remains unchanged from the previous level in step S313. Step S314 outputs only the control data "xx" to the page memory 206 at a portion thereof corresponding to the target pixel. Then, step S312 is performed as described above.

Figure 22:
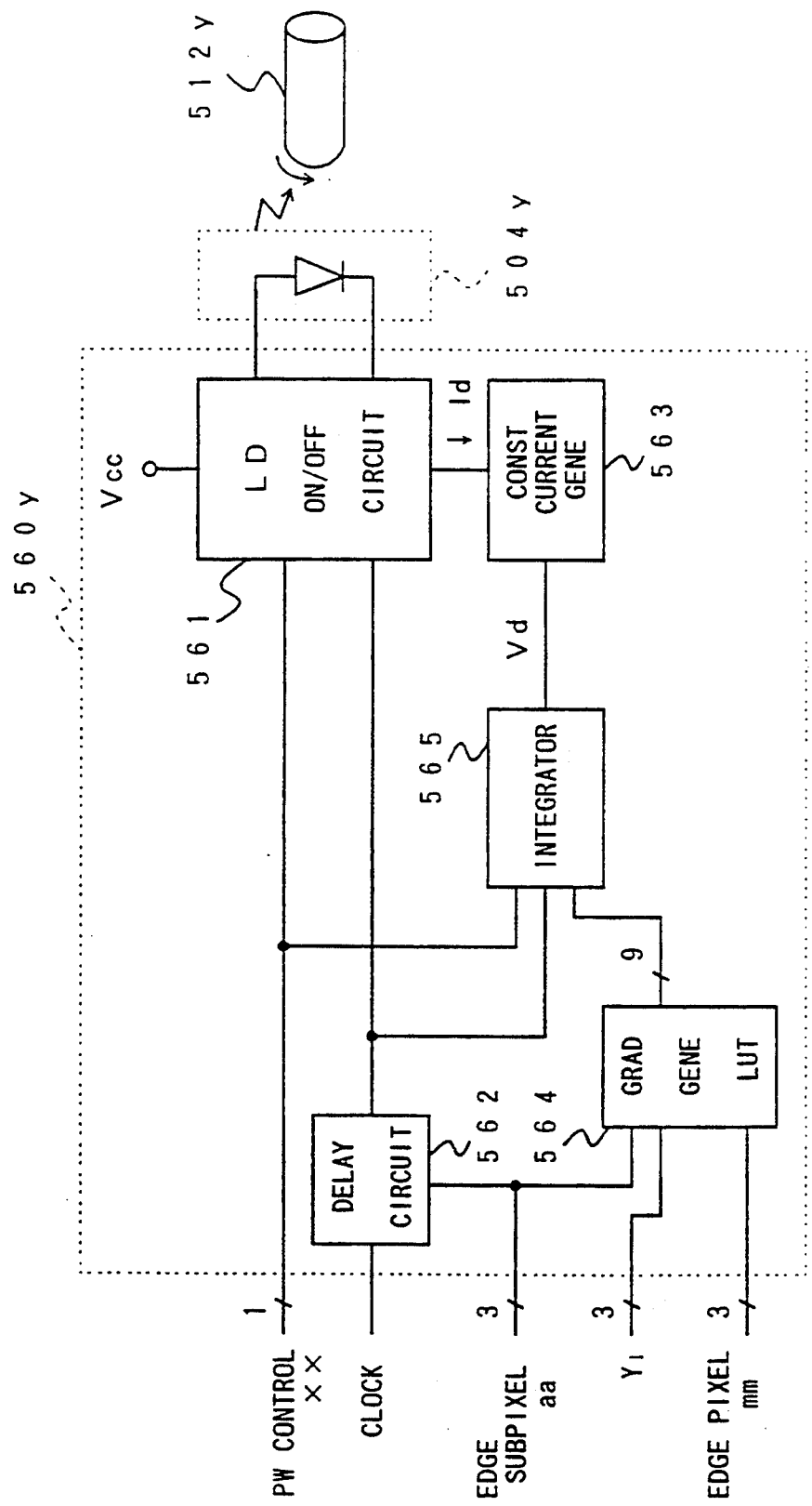
FIG. 22 is a block diagram showing a driver of a recording unit of the color laser printer of the second embodiment.

In the second embodiment, driver 560y, as shown in FIG. 22 is used in the color laser printer 500 instead of the driver 505y as shown in FIG. 10 of the first embodiment. In accordance with the 3-bit multilevel image data signals such as Y1 supplied by the image processor 400 via the PDL controller, the drivers control operations of corresponding laser diodes (for example, 504y as shown in FIG. 22) through the beam power modulation according to the invention. For the sake of convenience, only the driver 560y and the laser diode 504y with respect to a yellow image will be described in the following.

In FIG. 22, the driver 560y includes a laser diode on/off circuit 561, and this circuit 561 switches on and off the laser diode 504y according to the 1-bit power control data "xx" supplied by the image processor 400, in synchronism with a clock signal. The driver 560y includes a delay circuit 562 for generating a delayed clock signal from the clock signal. The driver 560y also includes a constant current generator 563, a gradient generator LUT 564, and an integrator 565 (which are essentially the same as in the first embodiment described above). The constant current generator 563 generates a drive current Id to drive the laser diode 504y which emits a laser beam, and the drive current Id is supplied to the circuit 561. The laser diode 504y is driven in accordance with this drive current Id so as to emit a laser beam to the photosensitive drum 512y. The gradient generator LUT 564 is provided so as to generate a gradient signal. The integrator 565 generates a proper time constant from the gradient signal output by the gradient generator LUT 564.

FIG. 23 shows a relationship between the clock signal, the edge subpixel data "aa", and the delay clock signal output by the delay circuit 562. A time delay of the delay clock signal relative to the clock signal is varied depending on the edge subpixel data "aa" supplied by the image processor 400 via the page memory 206. The delay circuit 562 of the second embodiment generates such a delay clock signal. In FIG. 23, "td" indicates a time duration of one pixel of the clock signal being divided by 8.

Figure 24A:
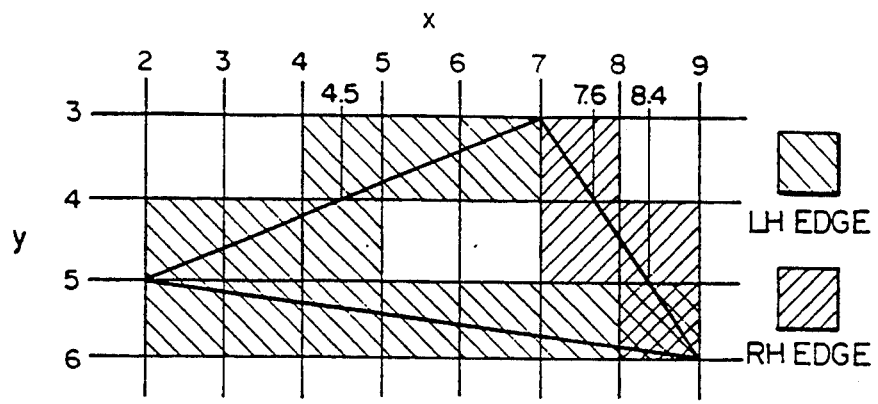
FIGS. 24A through 24C are diagrams for explaining an example of the result of the antialiasing process of the second embodiment.
Figure 24B:
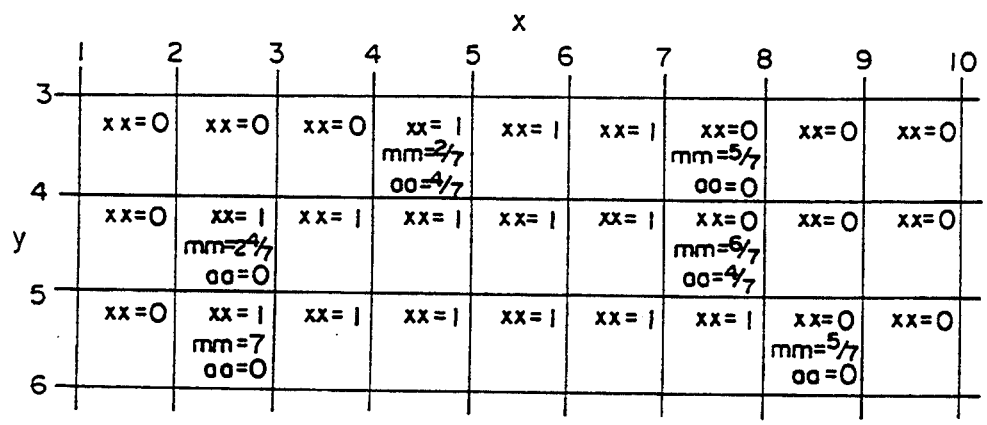
Figure 24C:
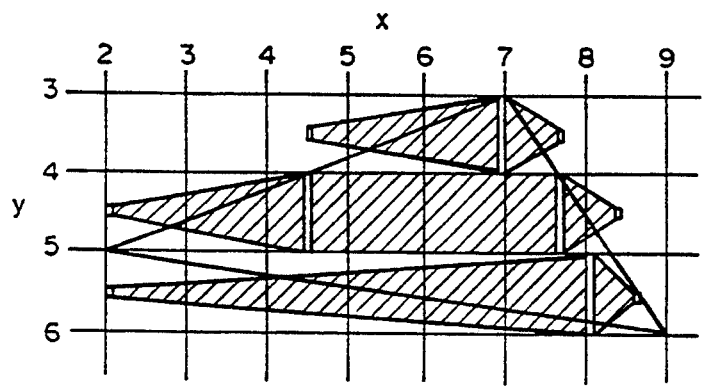

Referring to FIGS. 24A through 24C, an example of the result of the antialiasing process of the second embodiment will be described. FIG. 24A shows an image given by vector lines in x–y coordinate axes: a vector line-1 has a start point (7, 3) and an end point (2, 5); a vector line-2 has a start point (7, 3) and an end point (9, 6); and a vector line-3 has a start point (2, 5) and an end point (9, 6). In a detection process performed at scanlines at y=3, 4, intersecting points x0 and x1 between the vector line-1 and the two scanlines (y=3, 4) are detected at x=4.5 and x=7.0, respectively. Also, in this detection process, intersecting points x0 and x1 between the vector line-2 and the two scanlines (y=3, 4) are detected at x=7.0 and x=7.6, respectively. In this example, eight intensity levels are used with respect to each pixel of the image, i.e. n=8.

In FIG. 24A, there is no edge pixel between the two scanlines at y=3, 4 in a range from x=0 to x=3, and the control data "xx" is set to "0" in that range. A left-hand edge pixel exists at x=4 between the scanlines at y=3, 4, and this edge pixel is first detected in the detection process.

The control data "xx" is switched into "1" at x=4. The intersections between the vector line-1 and the scanlines are detected at x0=7 and x1=4.5, and the edge duration data "mm" is set to "2+4/7" because a fraction part of the absolute value of (x1−x0) is 0.5, and this fraction is converted into 4/7 which is a multiple of 1/(8−1). The edge subpixel data "aa" is set to "4/7" because the fraction part of the coordinate value of x1 is 0.5 and this fraction is converted into 4/7. Such data is written to the feature parameter memory part 206a of the page memory 206.

There are two pixels (x=4, 5) between the two scanlines at y=3, 4, but no edge pixel is there. No switching of the control data occurs, and only the control data "xx"=1 is written to the page memory. A right-hand edge pixel is then detected at x=7 in the detection process, and intersections between the scanlines at y=3, 4 and the vector line-2 are x0=7.0 and x1=7.6. The control data "xx" is again set to 0. Two intersections between the vector line-2 and the scanlines are detected at x0=7 and x1=7.6, and the edge duration data "mm" is set to "5/7" because a fraction part of the absolute value of (x1−x0) is 0.6, and this fraction is converted into 5/7 which is a multiple of 1/(8−1). The edge subpixel data "aa" is set to 0 because the fraction part of the coordinate value of x0 is 0. There are two pixels at x=8, 9, but no edge pixel is there. Only the control data "xx"=0 (no switching) is written. The above data with respect to the scanline is written to the feature parameter memory part 206a of the page memory 206 at a corresponding portion.

FIG. 24B shows the contents of the page memory 206 corresponding to the pixels within the range of 1<x<9 and 3<y<5 shown in FIG. 24A. FIG. 24C shows an output image generated in accordance with the data stored in the page memory 206 shown in FIG. 24B. In a case in which both a left-hand edge pixel and a right-hand edge pixel are detected in the same scanline, the data obtained with respect to the left-most edge pixel through a boundary pixel immediately before the right-hand edge is first written to the memory part 206a, and then the data obtained with respect to the right-hand edge pixel is overwritten to the memory part 206a from the boundary pixel.

In the above second embodiment, it is possible to quickly and efficiently output an image with smooth edges without computing the area factors with respect to edge pixels. Also, it is possible to prevent the intensity level of the image from being discontinuous with respect to some successive pixels due to the beam power modulation.

Next, a description will be given of a third embodiment of the present invention, with reference to FIGS. 25 through 37. As described above, in the third embodiment, a plurality of drivers (for example 570y as shown in FIG. 27) are used in the color laser printer 500 instead of drivers according to 505y of the first embodiment. With the rest of the construction and operations being similar to those of the first embodiment, a description thereof is thus omitted.

After the PDL controller has performed the prescribed processes, the color multilevel image data (RGB) is supplied to the color laser printer 500 via the image processor 400. The multilevel color image data of the edge pixels is output to the color laser printer 500 by continuously modulating the beam power which drives the laser diode of the color laser printer 500. In the third embodiment, in order to output an image with smooth edges, the color laser printer 500 requires the control data "xx" indicating a change of the beam power modulation, the edge duration data "mm" indicating a duration of the beam power modulation, an edge subpixel data "aa" indicating a position within a pixel at the start (or end) of the beam power modulation ($0<$"aa"$<1$), and an intensity level data "cc" indicating a prescribed reference beam power level in an image portion of an image. Such data is produced as the result of the antialiasing process of the third embodiment. In accordance with the above data received from the image processor 400 via the PDL controller 200, a laser beam power is continuously modulated in the color laser printer 500 from the background beam power level at the outermost edge pixel to the prescribed reference level in the image portion of the image. Thus, it is possible to carry out a fast, efficient antialiasing process without the need to compute the area factors, so that an image with smooth edges is generated without sacrificing the continuity of the image.

Figure 25:
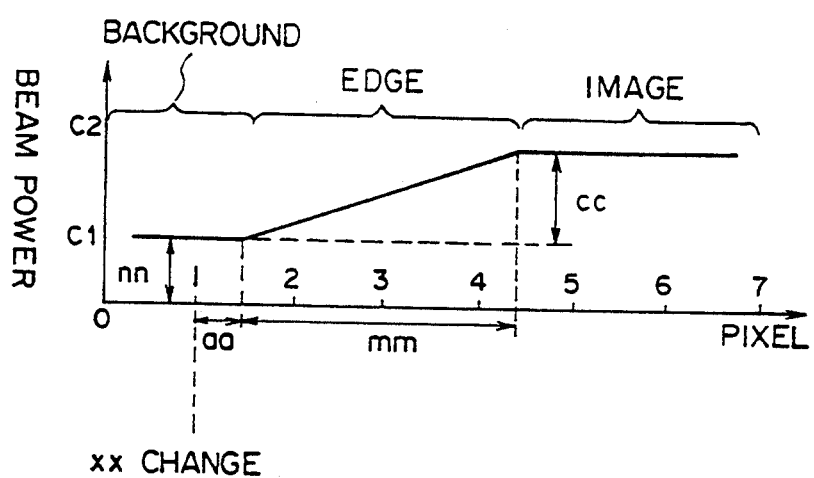
FIG. 25 is a diagram for explaining data necessary for the color laser printer to output an image with smooth edges.

FIG. 25 shows the data required by the color laser printer 500 for outputting an image with smooth edges. When the printing process is carried out by means of the color laser printer 500 for outputting edge pixels of an image, a laser beam power is continuously modulated from the background power level at the outermost edge pixel to the prescribed reference level in the image portion of the image. The outermost edge pixel (at which the beam power modulation changes) is indicated by the control data "xx", and the laser beam power is continuously modulated, for the duration indicated by the edge duration data "mm", from the background power level at the position within the outermost edge pixel (which position is indicated by the edge subpixel data "aa") to the prescribed reference level in the image portion of the image (which level is indicated by the intensity level data "cc").

Figure 26:
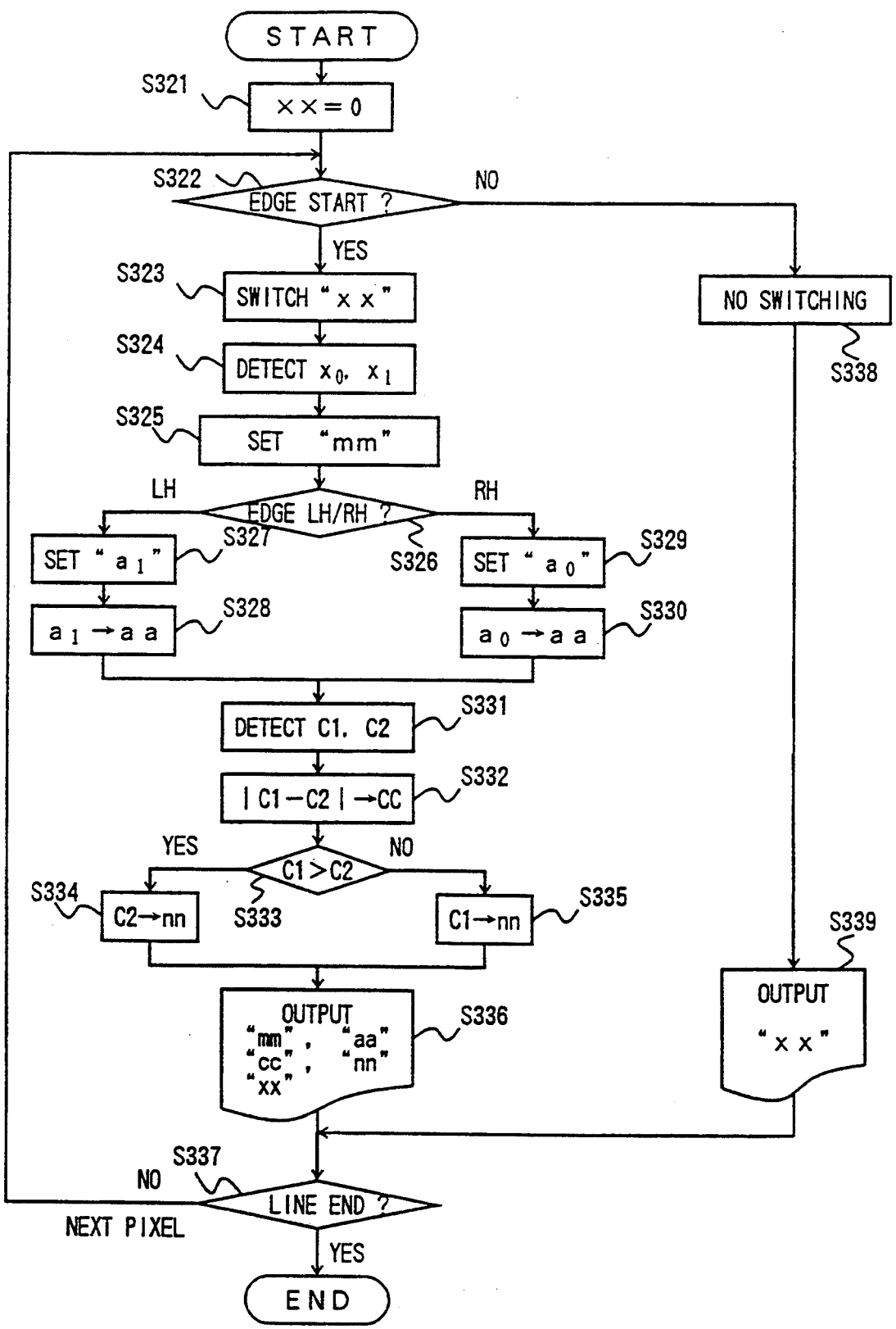
FIG. 26 is a flow chart for explaining a third embodiment of the antialiasing process according to the present invention.
Figure 27:
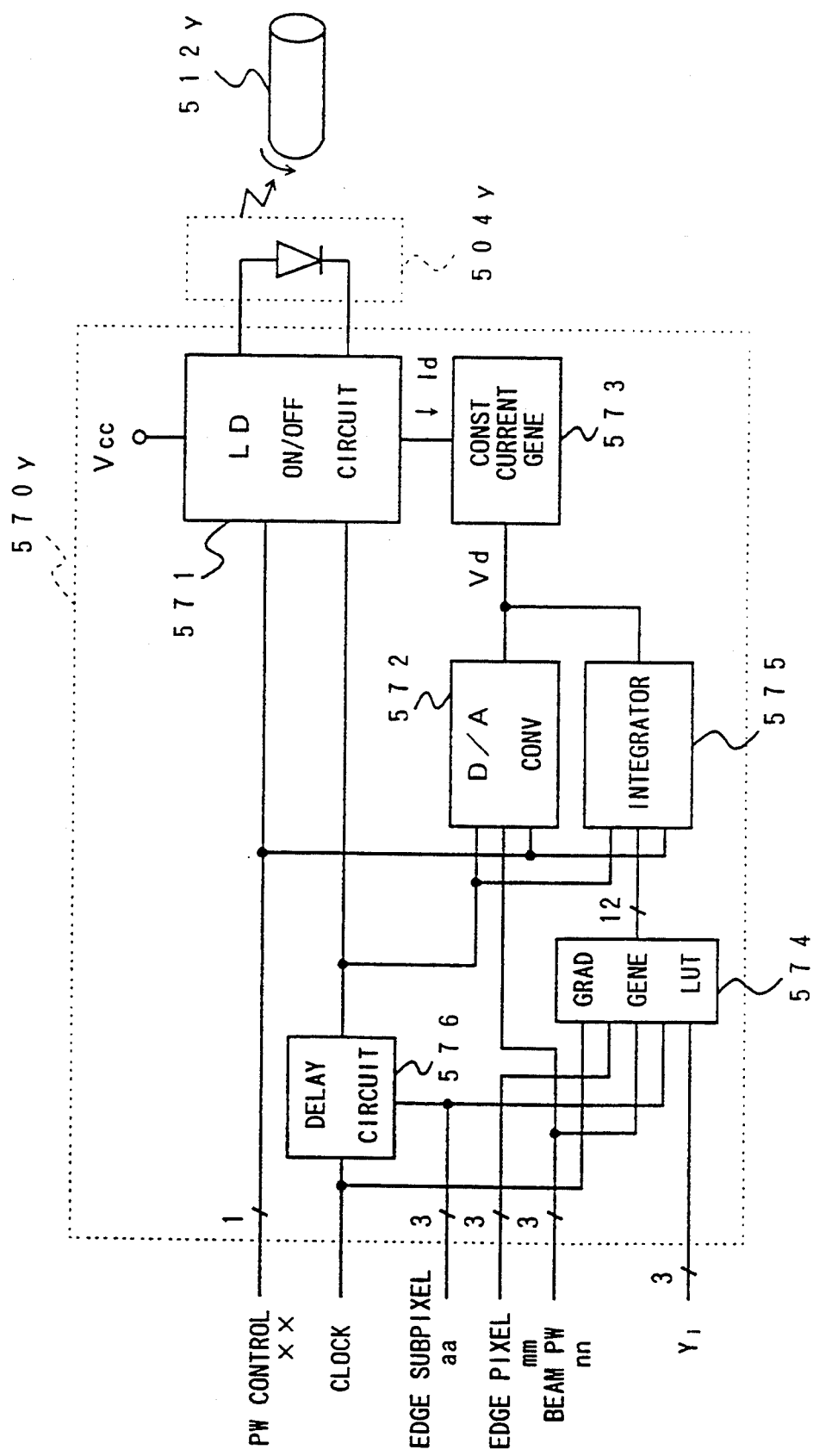
FIG. 27 is a block diagram showing a driver of a recording unit of the color laser printer according to the third embodiment.

FIG. 26 shows a process for generating the above data required for printing out an image with smooth edges. Each pixel of the image is described as an intensity level from among "n" intensity levels. Step S321 initially sets the control data "xx" to zero. Step S322 detects whether or not an edge of an image starts on a scanline when each scanline of the image is scanned. If the edge of the image starts on the scanline, step S323 switches a level of the control data "xx" to the opposite level. More specifically, when the control data "xx" is at the low level "0", it is changed to the high level "1" and vice versa. Step S324 detects values of integer portions of x coordinates of intersections (x0, x1) between the vector line and two scanlines. The intersecting point x0 is located nearer to the image portion than the intersecting point x1 is.

In accordance with the values of the intersecting points x0 and x1, step S325 calculates a value of the edge duration data "mm". In this calculation, a fraction part of an absolute value of (x0−x1) is converted into a multiple of $1/(n-1)$: n is the number of gradation levels indicated by the image data. This edge duration data "mm" indicates a duration of the beam power modulation, and is expressed in a multiple of $1/(n-1)$.

Step S326 detects whether the target pixel (at the intersecting point x1) is a left-hand edge pixel or a right-hand edge pixel. If it is detected as being a left-hand edge pixel, a fraction part of the coordinate value of the point x1 is converted into a multiple of $1/(n-1)$ in step S327, and a value of this multiple is designated by "a1". Step S328 sets the edge subpixel data "aa" to the value a1. Conversely, if the target pixel is detected as being a right-hand edge pixel, a fraction part of the coordinate value of the point x0 is converted into a multiple of $1/(n-1)$ in step S329, and a value of this multiple is designated by "a0". Step S330 sets the edge subpixel data "aa" to the value a0. This edge subpixel data "aa" indicates a position within the target pixel to start the beam power modulation, and is expressed in a multiple of $1/(n-1)$.

Step S331 detects an intensity level "c1" of an outermost edge pixel of the edge portion and an intensity level "c2" of the image portion of the image. Step S332 sets the intensity level data "cc" to an absolute value of (c1−c2) being calculated. Step S333 detects whether or not the intensity level "c1" of the outermost edge pixel is higher than the intensity level "c2" of the image portion. If c1>c2, step S334 sets the beam power data "nn" to c2. Conversely, if c1<c2, step S335 sets the beam power data "nn" to c1.

Step S336 outputs the data "xx", "mm", "nn", "aa", "cc" to the page memory 206 at a portion thereof corresponding to the target pixel of the image. Step S337 detects whether or not one scanline of the image ends. If the scanline does not end, the target pixel is shifted to a next pixel and the steps S322 through S337 are repeated until the scanline ends. If step S322 detects that an edge of the image does not start on the scanline, step S338 does not switch the level of the control data "xx". The level of the control data "xx" remains unchanged from the previous level in step S338. Step S339 outputs only the control data "xx" to the page memory 206 at a portion thereof corresponding to the target pixel. Step S337 is then performed as described above.

In the third embodiment, drivers according to 570y, are used in the color laser printer 500 instead of the drivers according to 505y of the first embodiment. In accordance with the 3-bit multilevel image data signals such as Y1 supplied by the image processor 400 via the PDL controller, the drivers control operations of corresponding laser diodes such as 504y through the beam power modulation according to the invention. For the sake of convenience, only the driver 570y and the laser diode 504y with respect to a yellow image will be described in the following.

In FIG. 27, the driver 570y includes a laser diode on/off circuit 561, and this circuit 561 switches on and off the laser diode 504y according to the 1-bit power control data "xx" supplied by the image processor 400, in synchronism with a clock signal. The driver 570y includes a delay circuit 576 for generating a delay clock signal from the clock signal. The driver 570y also includes a constant current generator 573, a gradient generator LUT 574, and an integrator 575. The constant current generator 573 generates a drive current Id which drives the laser diode 504y for laser beam emission, and the drive current Id is supplied to the circuit 561. The laser diode 504y emits a laser beam to the photosensitive drum 512y in accordance with the drive current Id generated by the constant current generator 573. The gradient generator LUT 574 outputs a gradient signal. The integrator 575 generates an appropriate time constant in accordance with the gradient signal output by the gradient generator LUT 574.

Figure 28:
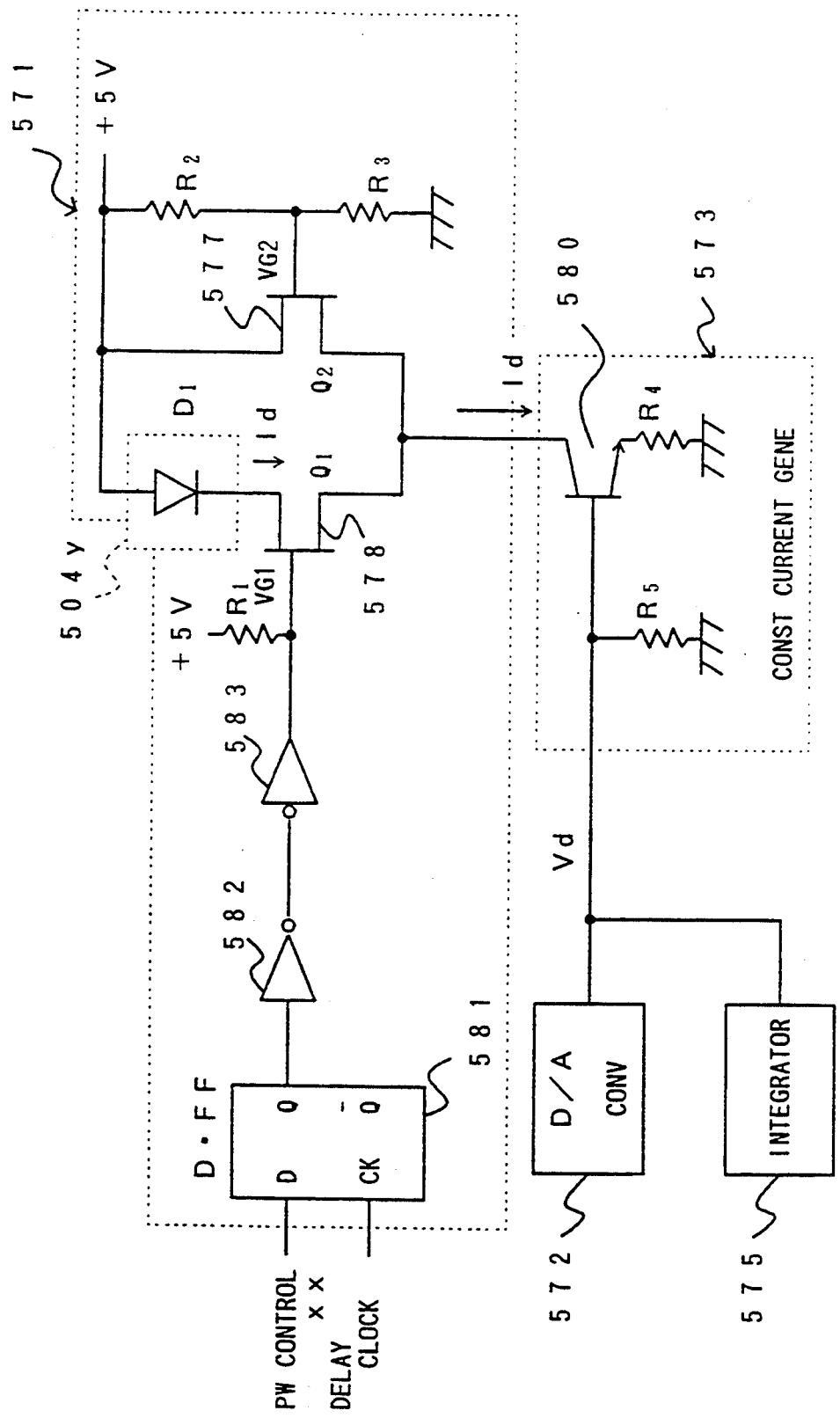
FIG. 28 is a block diagram showing a laser diode on/off circuit and a constant current generator of FIG. 27.

FIG. 28 shows the construction of the laser diode on/off circuit 571 and the constant current generator 572. The laser diode on/off circuit 571 includes a D flip-flop 581, two TTL inverters 582 and 583, differential switching circuits 577 (Q2) and 578 (Q1), and a voltage divider having resistors R2 and R3. The differential switching circuits 577 and 578 perform on/off toggle switching actions. The voltage divider generates a voltage VG2 so as to satisfy the following conditions: when the voltage VG1 is lower than the voltage VG2, the switching circuit 578 is switched ON and the switching circuit 577 is switched OFF, and when VG2>VG1, the circuit 578 is switched OFF and the circuit 577 is switched ON.

Figure 29:
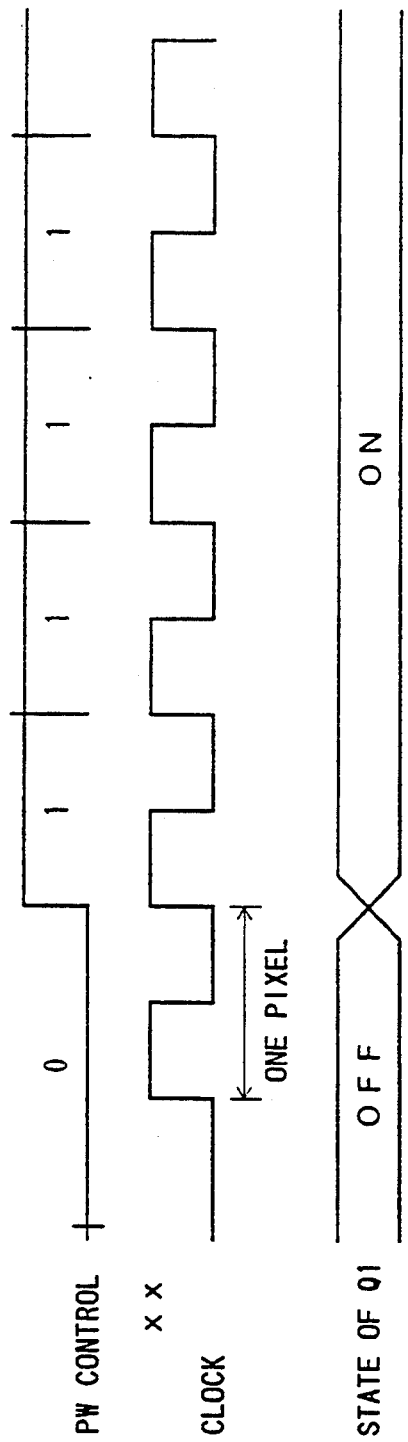
FIG. 29 is a time chart for explaining operations performed by the laser diode on/off circuit of FIG. 27.

FIG. 29 shows operations performed by the laser diode on/off circuit 571. When the output Q of the D flip-flop 581 is at the high level "1" in accordance with the power control data "xx", the switching circuit 578 (Q1) is switched ON and the switching circuit 577 (Q2) is switched OFF. The current Id flowing through the laser diode 504y is supplied via the constant current generator 573.

Figure 30:
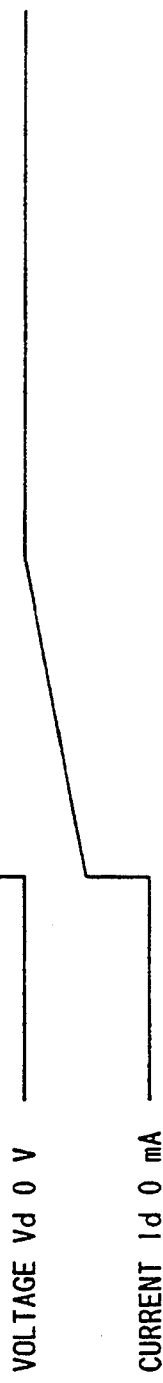
FIG. 30 is a diagram showing the relationship between the control voltage and the laser diode current.

In FIG. 28, the constant current generator 573 includes a transistor 580 and resistors R4 and R5. The generator 580 generates the drive current Id, and, in accordance with the drive current Id, the laser diode 504y irradites a laser beam to the photosensitive drum 512y. The control voltage Vd output by the D/A converter 572 is supplied to a base of the transistor 580, determining a current flowing through the resistor R4. The drive current Id is proportional to the current flowing through the resistor R4. FIG. 30 shows a relationship between the control voltage Vd and the current Id. The current flowing through the laser diode 504y is thus controlled by the control voltage Vd supplied to the transistor 580.

Figure 31:
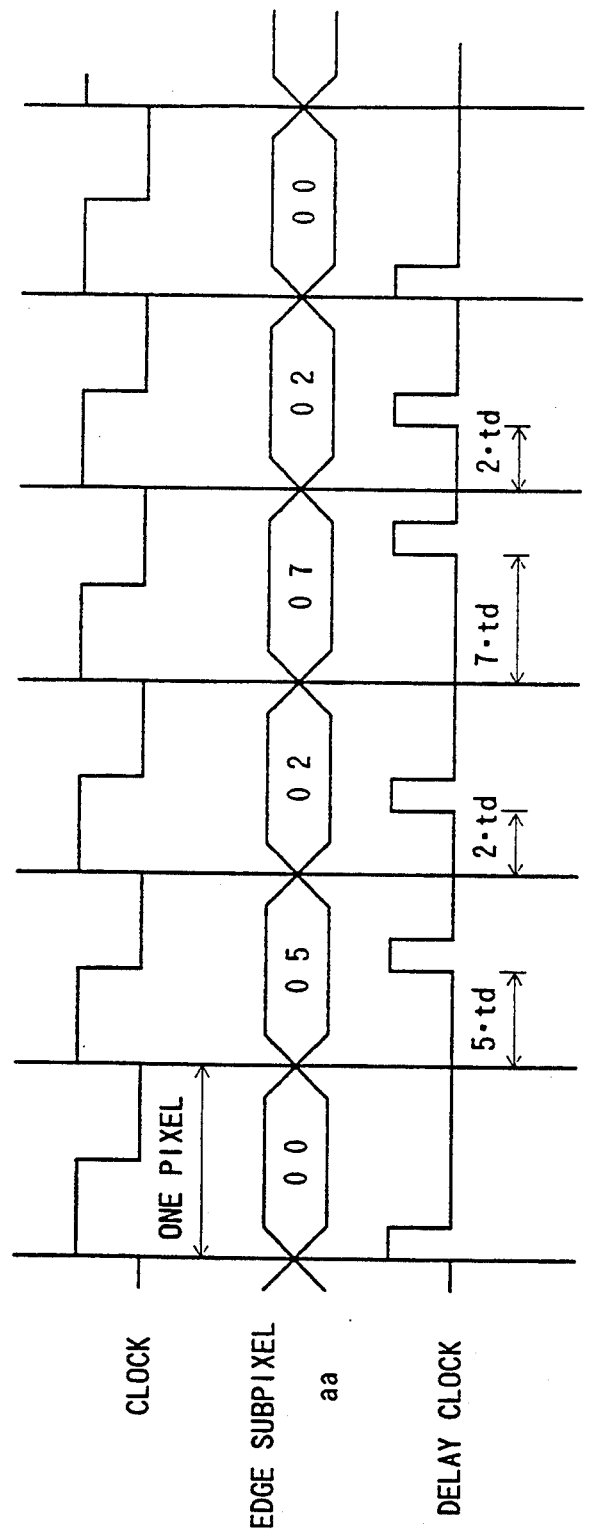
FIG. 31 is a time chart for explaining operations performed by a delay circuit.

FIG. 31 shows a relationship between the clock signal, the edge subpixel data "aa", and the delay clock signal output by the delay circuit 576. A time delay of the delay clock signal relative to the clock signal is determined depending on the edge subpixel data "aa" supplied by the image processor 400 via the page memory 206. The delay circuit 576 generates a delay clock signal indicative of such a time delay. In FIG. 31, "td" indicates a time duration of ⅛ of a time duration corresponding to one pixel of the clock signal.

Figure 32:
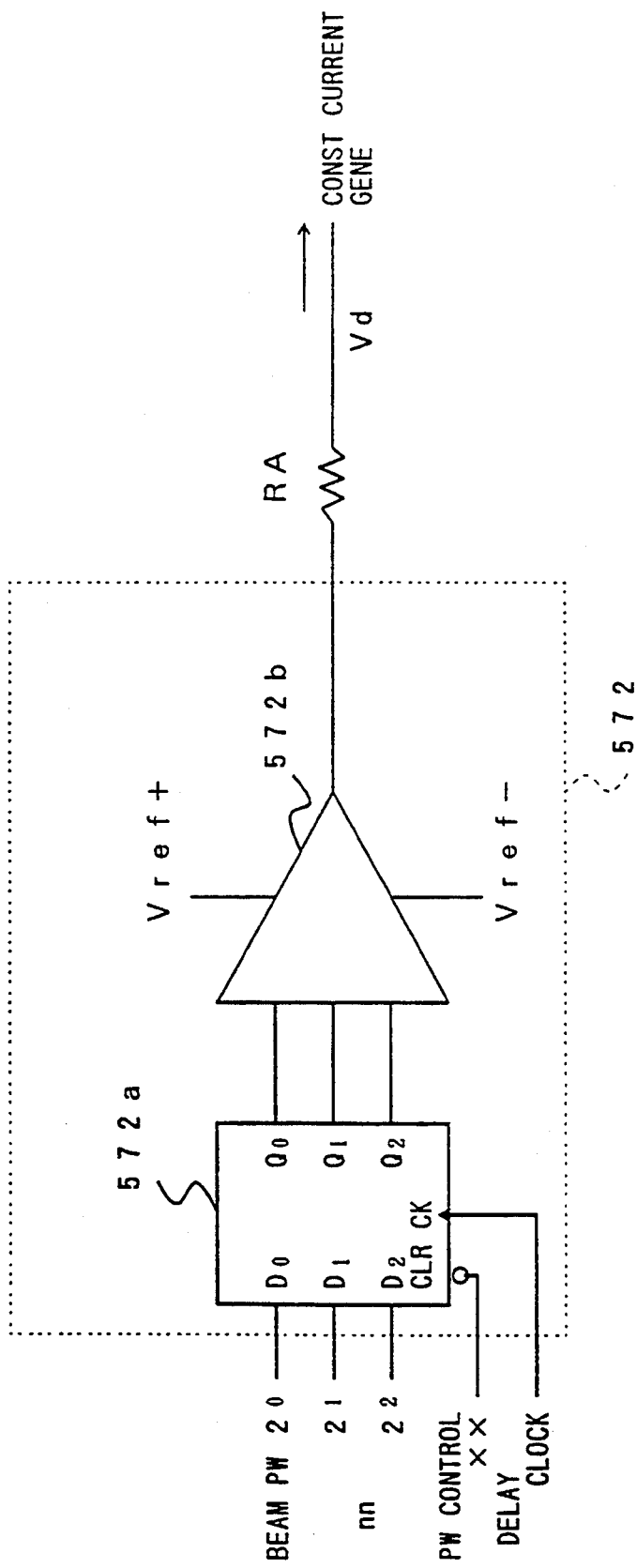
FIG. 32 is a diagram showing a D/A converter of the driver of FIG. 27.
Figure 33:
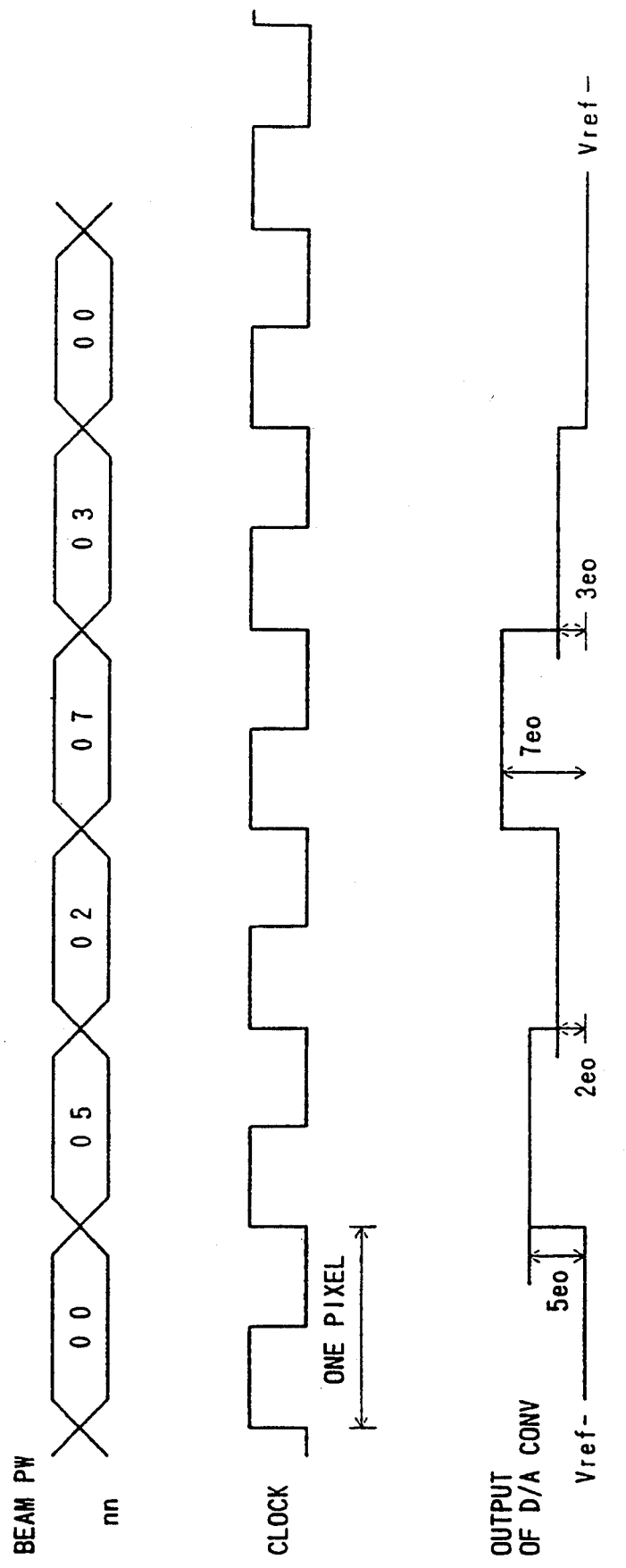
FIG. 33 is a time chart for explaining an output of the D/A converter of FIG. 32.

FIG. 32 shows the construction of the D/A converter 572. In FIG. 32, the D/A converter 572 includes a 3-bit latch 572a and a 3-bit converter 572b. Each time the delay clock signal changes at its leading edge from the low level "0" to the high level "1", the 3-bit beam power data "nn" is held by the latch 572a. The beam power data "nn" held by the latch 572a is input to the 3-bit converter 572b. In accordance with the beam power data "nn", a voltage difference between Vref+ and Vref− is converted into a control voltage, and the converter 572b outputs this converted voltage. The voltage output by the D/A converter 572 is supplied to the constant current generator 573 via a resistor RA. FIG. 33 shows relationship between the beam power data "nn", the clock signal, and the D/A converter output. As shown in FIG. 33, the voltage difference e0 between Vref+ and Vref− is converted into a control voltage in accordance with the level of intensity indicated by the beam power data "nn". This converted voltage is supplied by the D/A converter 572 to the constant current generator 573.

FIG. 34 shows a relationship between the power control data "xx" and the integrator output voltage. The integrator 575 is provided so that an integration voltage can be output in accordance with the change of the beam power modulation indicated by the 1-bit control data "xx". As shown in FIG. 34, a gradient of a waveform of the integration voltage signal output by the integrator 575 (which gradient is either a voltage rising portion of the signal or a voltage falling portion thereof) is determined in accordance with the gradient signal output by the gradient generator LUT 574. In the LUT 574, such a gradient data which determines the gradient of the integration voltage is calculated, in advance, in accordance with the beam power data "nn", the edge duration data "mm" and the 3-bit gradation data "Y1" received from the image processor 400 as follows.

$$gradient = (Y1 - nn)/mm \qquad (4)$$

Figure 35A:
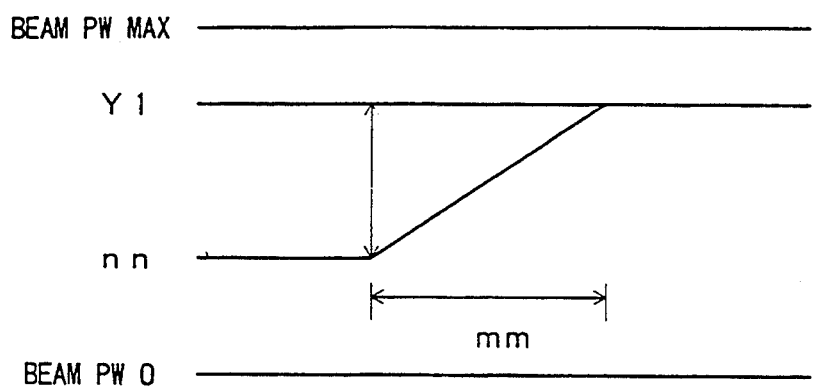
FIGS. 35A and 35B are diagrams for explaining operations performed by a gradient generator LUT of the driver of FIG. 32.

The gradient signal is supplied from the LUT 574 to the integrator 575. FIG. 35A shows the process of calculating the gradient data, which data is output by the LUT 574. The gradient data is calculated according to the formula (4) above.

Figure 35B:
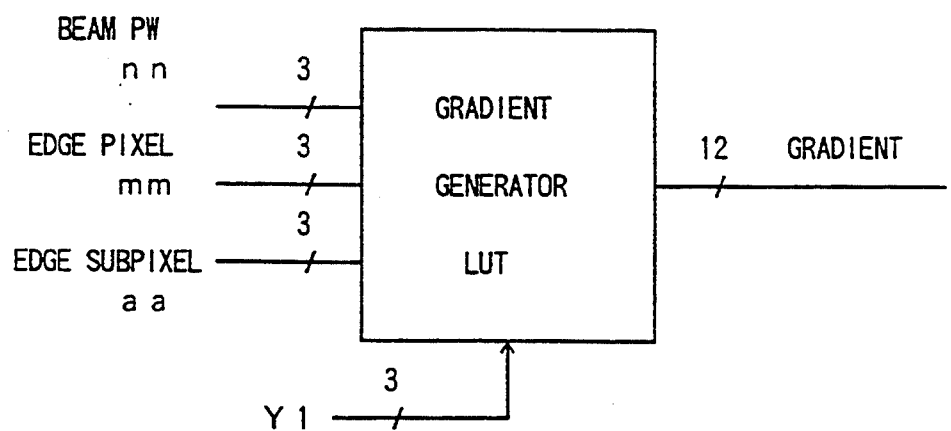

FIG. 35B shows the construction of the gradient generator LUT 574. As shown in FIG. 35B, the beam power data "nn" is a 3-bit data indicating a total of eight levels of intensity, the edge duration data "mm" is a 3-bit data indicating a total of eight values of the duration of beam power modulation, the edge subpixel data "aa" is a 3-bit data indicating a total of eight values, and the image gradation data Y1 is a 3-bit data indicating a total of eight levels of gradation. Thus, the gradient data supplied by the gradient generator LUT 574 is a 12-bit data indicating a total of 4096 values.

Figure 36:
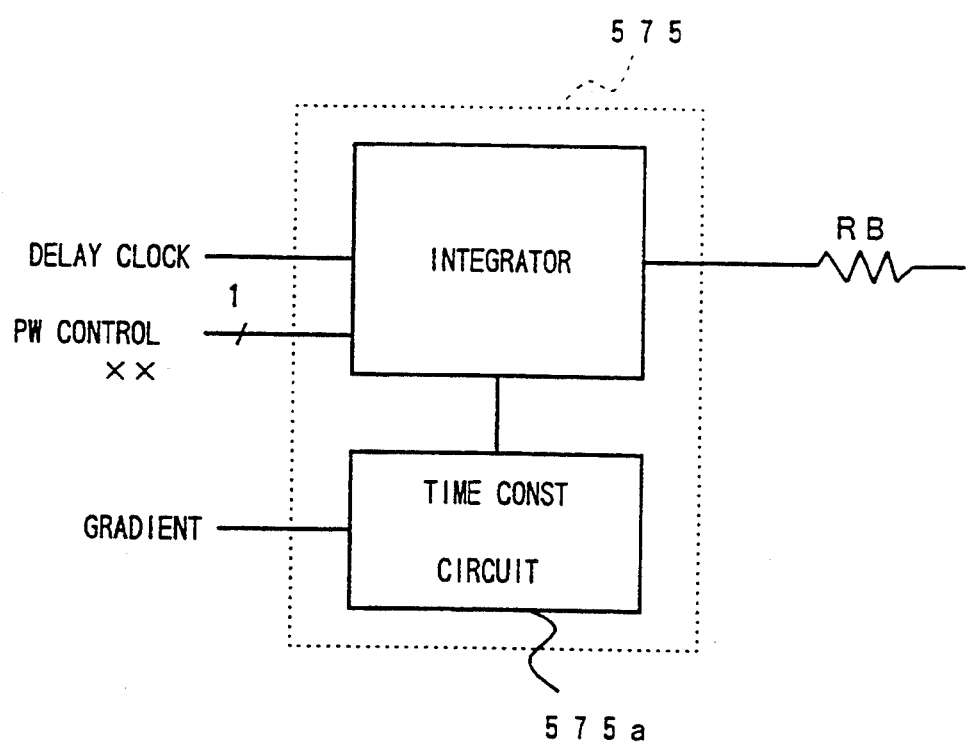
FIG. 36 is a diagram showing the integrator of the driver of FIG. 27.

FIG. 36 shows the construction of the integrator 575. The integrator 575 includes a time constant circuit 575a coupled thereto. In this time constant circuit 575a, 4096 values of predetermined time constants are prerecorded. In accordance with the gradient signal received from the LUT 574, an appropriate time constant is selected from among the predetermined time constants and the integrator 575 outputs a signal indicating the selected time constant. In short, the voltage output by the D/A converter 572 via the resistor RA and the voltage output by the integrator 575 via the resistor RB are combined together so as to produce the control voltage Vd, and this control voltage Vd is input to the constant current generator 573 as mentioned above.

Figure 37A:
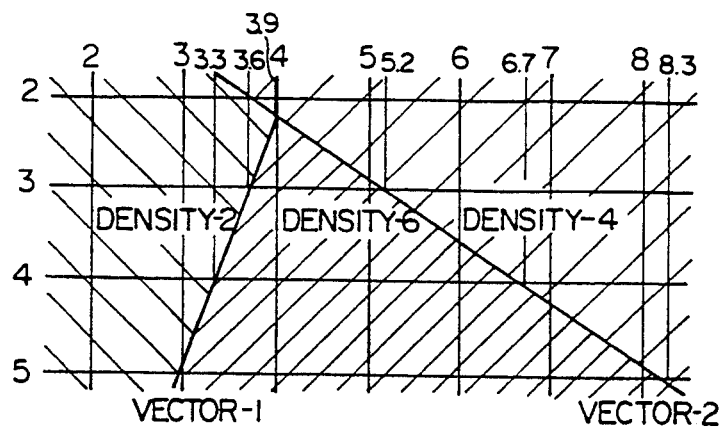
FIGS. 37A through 37C are diagrams for explaining an example of the result of the antialiasing process of the third embodiment.
Figure 37B:
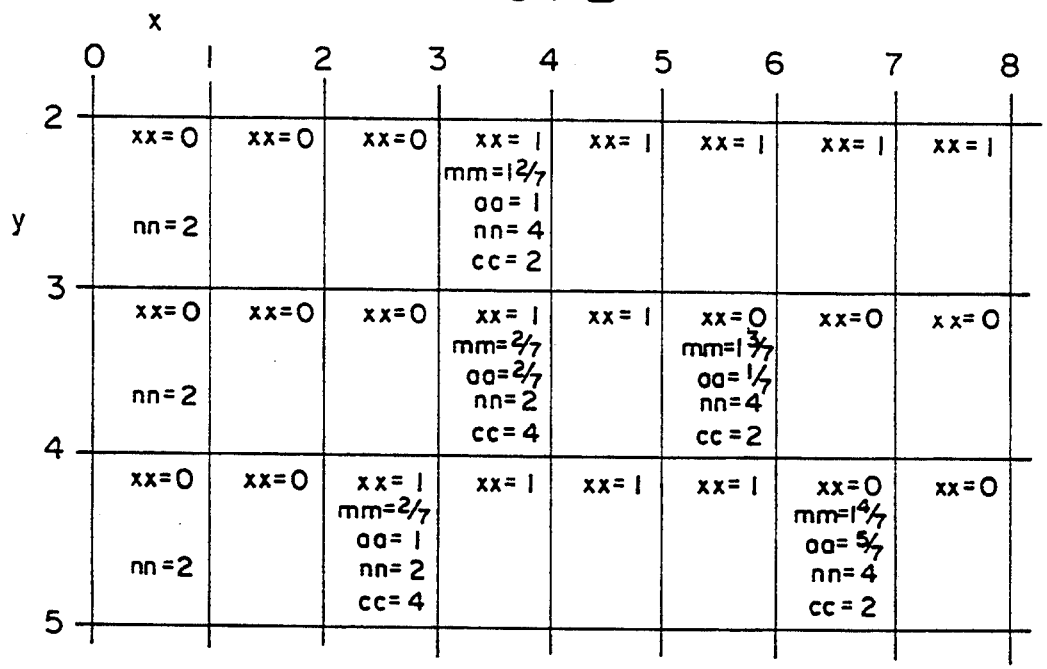
Figure 37C:
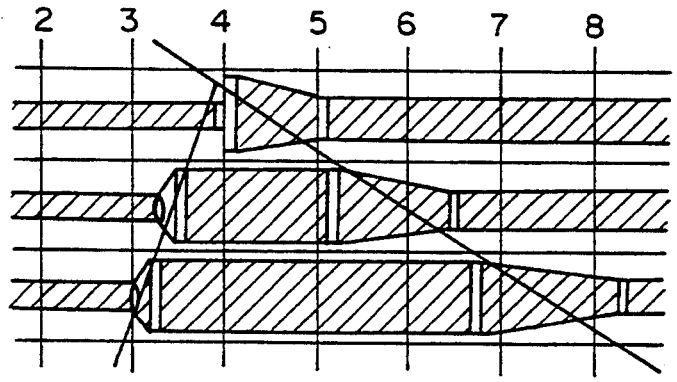

Referring to FIGS. 37A through 37C, an example of the result of the antialiasing process of the third embodiment will be described. FIG. 37A shows an image defined by two vector lines in x-y coordinate axes. In a detection process performed at scanlines at y=3, 4, intersecting points between a vector line-1 and the two scanlines are detected at x1=3.3 and x0=3.6, respectively. Also, in this detection process, intersecting points between a vector line-2 and the two scanlines are detected at x0=5.2 and x1=6.7, respectively. In the image of FIG. 37A, the density level of a left-hand region is 2, the density level of a middle region is 6, and the density level of a right-hand region is 4.

In FIG. 37A, there is no edge pixel between the two scanlines at y=3, 4 in a range between x=0 and x=2, and the control data "xx" is set to "0". The beam power data "nn" is set to 2. A left-hand edge pixel is detected at x=3 between the scanlines at y=3, 4, and it is first detected on the scanlines in the detection process. At x=3, the level of the control data "xx" is switched to 1. The vector line-1 passes through only one pixel at x1=3.3 and x0=3.6.

As described above, the level of the control data "xx" at x=3 is switched to 1. The intersections between the vector line-1 and the scanlines are detected at x0=3.6 and x1=3.3, and the edge duration data "mm" is set to 2/7 because the fraction part of the absolute value of (x1−x0) is 0.3, and this fraction is converted into 2/7 which is a multiple of 1/(n−1). The edge subpixel data "aa" is set to 2/7 because the fraction part of the coordinate value of x1 is 0.3, and this fraction is converted into 2/7. At this edge pixel, the beam power level must be modulated from 2 to 6, and the intensity level data "cc" is set to 4. The above data is written to the feature parameter memory part 206a of the page memory 206. At the edge pixel (x=3), a control voltage which allows an increase of beam power, corresponding to the time duration of 2/7 of one pixel, is combined with a control voltage which maintains the beam power at level 2.

At the pixel (x=4), the level of the control data "xx" is not switched and only "xx"=1 is written to the page memory 206. A right-hand edge pixel is detected at x=5 in the detection process, and the two intersections between the scanlines at y=3, 4 and the vector line-2 are x0=5.2 and x1=6.7. The level of the control data "xx" at x=5 is switched to 0. The fraction part of the absolute value of (x1−x0) is 0.5, this fraction part being converted into 3/7, and the integer part of the absolute value of (x1−x0) is 1. The integer "1" and the fraction "0.5" are converted into a multiple of 1/(8−1), the edge duration data "mm" being set to (1+3/7). The fraction part of the coordinate value of the point x0 is 0.2, this fraction part being converted into 1/7, and the edge subpixel data "aa" being set to 1/7. The beam power data "nn" is set to 4. It is necessary that the beam power level is modulated from 6 to 4 as shown in FIG. 37A, and the intensity level data "cc" is set to 2. The above data is written to the page memory 206.

No edge pixel is detected at x=7, and no switching of the control data "xx" is performed. Only the control data "xx" is written to the page memory 206. The above data with respect to the scanline is written to the feature parameter memory part 206a of the page memory 206.

FIG. 37B shows the contents of the page memory 206 corresponding to the pixels in the range of 0<x<7 and 2<y<5 shown in FIG. 37A. FIG. 37C shows an output image generated in accordance with the data stored in the page memory 206 shown in FIG. 37B. In a case in which both a left-hand edge pixel and a right-hand edge pixel are detected in the same scanline, first the data obtained with respect to the left-most edge pixel through a boundary pixel immediately before the right-hand edge is written to the page memory 206, and then the data obtained with respect to the right-hand edge pixel is overwritten to the page memory 206 at a portion corresponding to the boundary pixel. In a case in which two vector lines coexist at a pixel, the data obtained with respect to the final edge pixel being processed is overwritten to the page memory at a portion corresponding to the pixel.

In the third embodiment, it is possible to efficiently output an image with smooth edges by reducing the number of pixels to be processed in the antialiasing process. Also, it is possible to prevent the intensity level of the image from being discontinuous with respect to some successive pixels of the image due to the beam power modulation. Also, with respect to edges of an image having a halftone background, it is possible to carry out an antialiasing process without executing read/modify/write commands to exchange data from and to the page memory, thus eliminating a problem which may arise due to overwriting operations.

Figure 38:
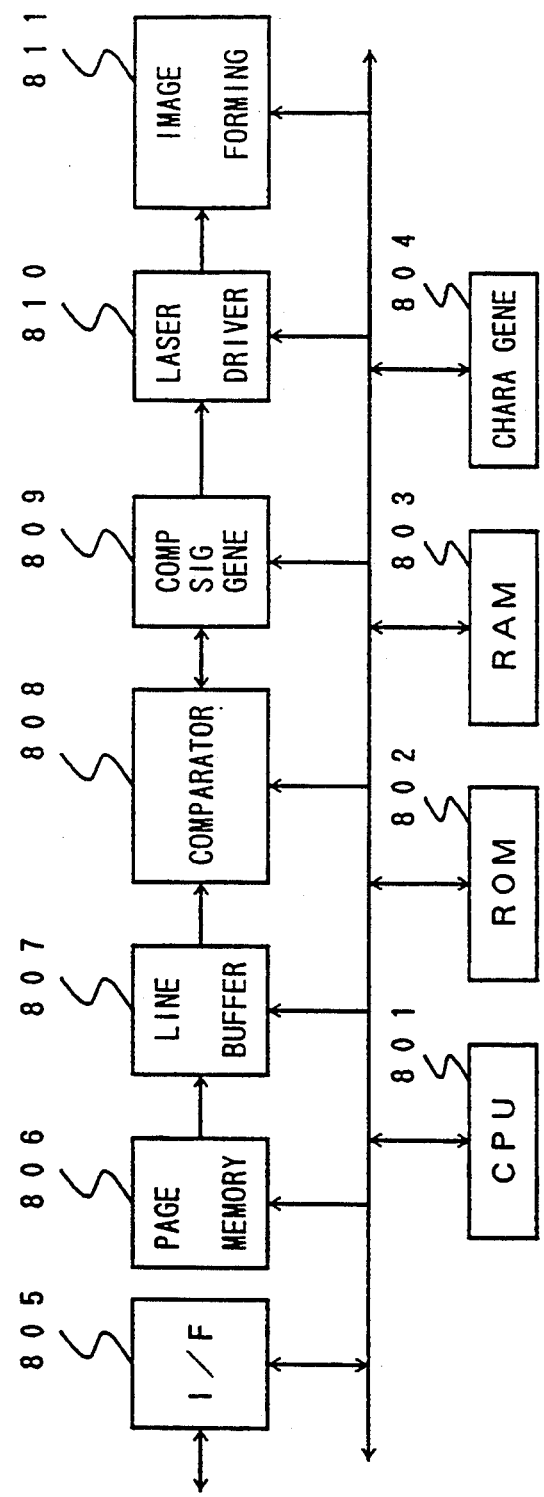
FIG. 38 is a block diagram showing an embodiment of a graphics processing apparatus according to the present invention.

Next, a description will be given of a fourth embodiment of the present invention. FIG. 38 shows an image forming system to which the fourth embodiment of the present invention is applied. This image forming system generates an output image with smooth edges by smoothing edges of an image described in dot matrix format, so that a high quality image is output without sacrificing continuity of the image luminance or intensity with respect to some successive pixels of the image.

In FIG. 38, the image forming system includes a CPU 801 for controlling operations of the system in accordance with a control program, a ROM 802 for storing the control program, a RAM 803 for temporarily storing and supplying necessary data when the control program is executed, and a character generator 804 for generating a dot matrix indicating a text image from a character code. The image forming system also includes an interface (I/F) 805 for inputting image data from an external unit such as a personal computer, a page memory 806 for storing a page of image data supplied via the I/F 805, a line buffer 807 having an FIFO memory in which a dot matrix of a prescribed size being read out from the page memory 806 is loaded, a comparator 808 for generating a compensation data when the dot matrix stored in the line buffer 807 accords with a pre-recorded standard pattern, a signal generator 809 for receiving the compensation data from the comparator 808 and for generating a compensation signal with respect to a target pixel, a laser diode driver 810 for emitting a laser beam in accordance with the compensation signal generated by the signal generator 809, and an image forming unit 811 for performing an image forming process in which an electrostatic latent image is formed on a photosensitive medium by a laser beam via the laser diode driver 810.

FIGS. 39A and 40A show examples of standard patterns pre-recorded in the comparator 808. In the comparator 808, a dot matrix pattern arranged in m×n formation (m, n>0) is used as the standard pattern, and a dot matrix stored in the line buffer 807 is compared with the standard pattern. FIGS.39B and 40B show the results of the antialiasing process which is performed when the dot matrix accords with the standard pattern. FIGS.39C and 40C show a position within a target pixel at which the beam power modulation is started and a smooth edge line of the image is produced.

In the case shown in FIGS.39A through 39C, the comparator 808 generates a compensation data SS and a select signal S1 with respect to a target pixel. The compensation data SS includes a subpixel data indicating a position within a target pixel at which laser beam power modulation is started, and a duration data indicating a duration of the laser beam power modulation being started at the position indicated by the subpixel data. The select signal S1 indicates whether a pulse position modulation or a beam power modulation should be performed with respect to the target pixel. In accordance with the compensation data SS and the select signal S1 received from the comparator 808, the signal generator 809 generates a compensation signal with respect to the target pixel. In the signal generator 809, the drive current flowing through the laser diode is controlled so as to continuously modulate a laser beam emitted by the laser diode. In the beam power modulation process, a dot with a diameter smaller than an ordinary dot diameter is produced in accordance with the drive current, and the position within the target pixel at which the beam power modulation is started is adjusted. Assuming that a diameter of the ordinary dot being output by the laser printer is "1" (integer), the position within the target pixel at which the beam power modulation is started is indicated as "ks" ($0 < ks < 1$). This position data "ks" is detected from the subpixel data received from the comparator 808. Thus, in the fourth embodiment, the position within the target pixel at which the beam power modulation is started is determined by the select signal S1 and the detected position data "ks". Starting from such a position of the target pixel, the laser beam power of the laser diode is modulated from a minimum level to a maximum level with respect to a plurality of successive pixels indicated by the duration data received from the comparator 808.

In the case shown in FIGS.40A through 40C, the comparator 808 generates the compensation data SS and the select signal S1 with respect to a target pixel in a manner similar to that of the case shown in FIGS.39A through 39C. In accordance with the compensation data SS and the select signal S1 received from the comparator 808, the signal generator 809 generates the compensation signal with respect to the target pixel. In the signal generator 809, a beam power modulation process is performed so that a dot with a smaller diameter is produced. Then, the position within the target pixel at which the beam power modulation is started is adjusted. In FIG. 40C, the position within the target pixel at which the beam power modulation is started is indicated as "ke" ($0 < ke < 1$). This position data "ke" is detected from the subpixel data received from the comparator 808. Thus, the position within the target pixel at which the beam power modulation is started is determined by the select signal S1 and the detected position data "ke". Starting from such a position of the target pixel, the laser beam power of the laser diode is modulated from the maximum level to the minimum level with respect to a plurality of successive pixels indicated by the duration data received from the comparator 808.

Figure 41A:
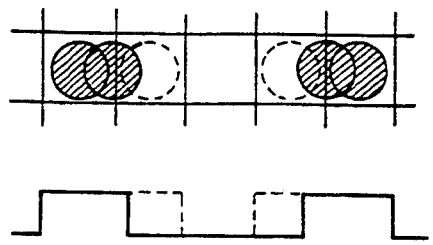
FIGS. 41A through 41C are diagrams for explaining a beam power modulation performed by the apparatus of FIG. 38.
Figure 41B:
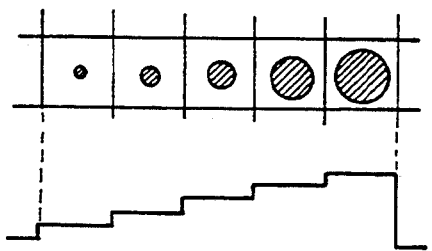
Figure 41C:
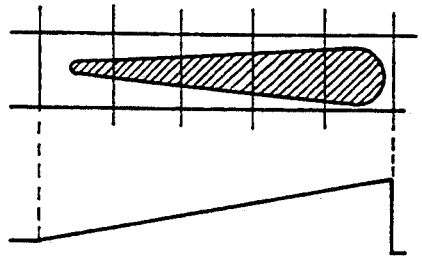

As described above, the comparator 808 generates the select signal S1 in addition to the compensation data SS. The select signal S1 instructs whether the pulse position modulation or the beam power modulation should be performed with respect to the target pixel. FIG. 41A shows a pulse position modulation process. In this process, a position of a dot is shifted by retarding or advancing a timing of arrival of a pulse signal of a drive current for switching on and off the laser diode. FIG. 41B shows a beam power modulation process. In this beam power modulation process, the power of the laser beam is modulated by varying the amount of the drive current flowing through the laser diode, so that dots with smaller diameters are produced. FIG. 41C shows the beam power modulation process used in the fourth embodiment. The laser beam power of the color laser printer is continuously modulated according to the compensation data as described above. In accordance with the dot matrix in the line buffer as described above, it is detected whether the pulse position modulation or the beam power modulation should be performed.

Figure 42:
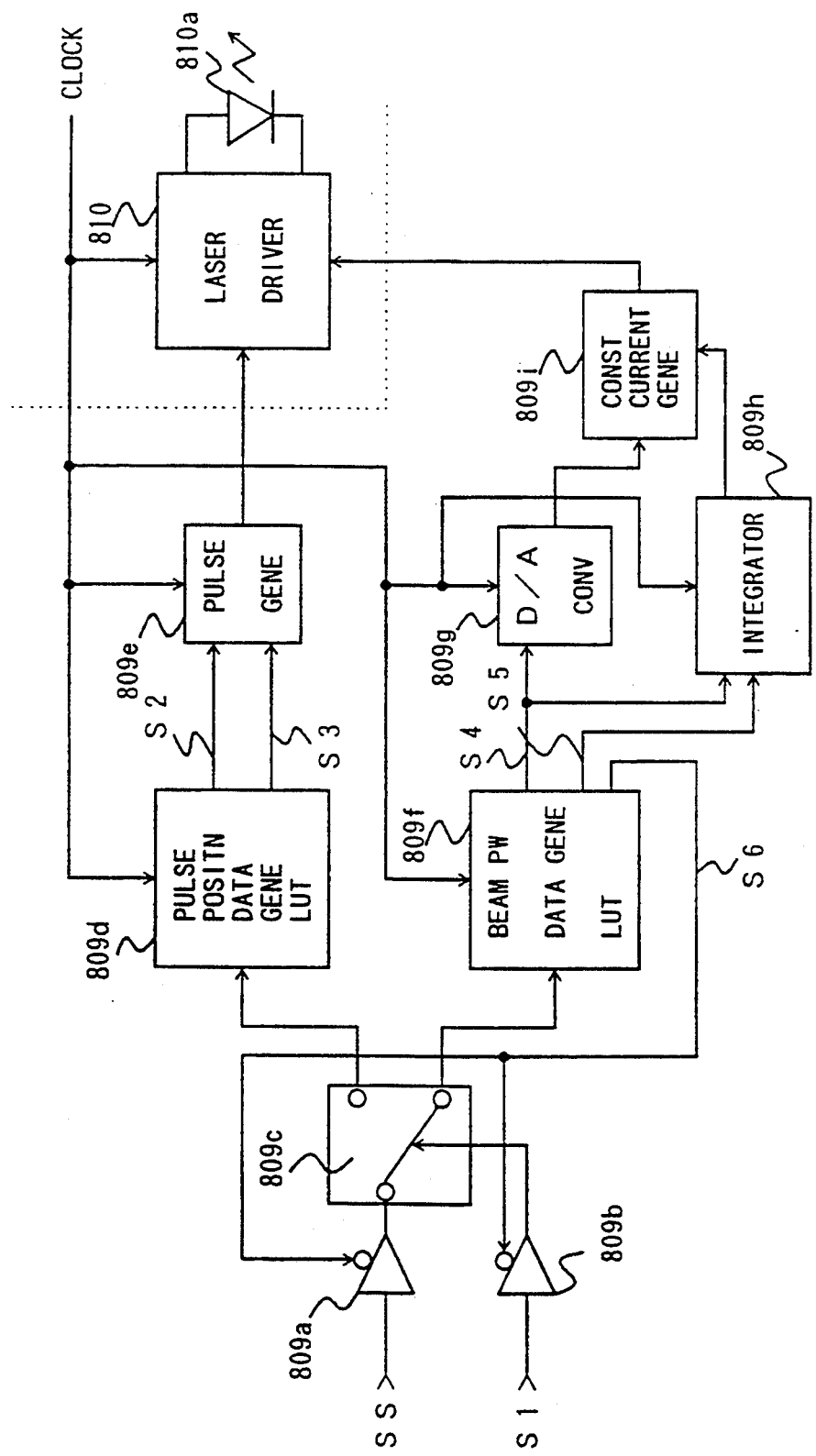
FIG. 42 is a block diagram showing a compensation signal generator of the apparatus of FIG. 38.

FIG. 42 shows the construction of the competition signal generator 809. The compensation data SS and the select signal S1 with respect to the target pixel are input to the compensation signal generator 809 via a 3-state buffer 809a and a 3-state buffer 809b, respectively. When the laser beam power is continuously modulated with respect to three or more pixels, intensity levels of intermediate pixels between a start point of the beam power modulation and an end point thereof are automatically determined according to the compensation data SS with respect to the target pixel. For this reason, the 3-state buffers 809a and 809b act to inhibit the comparator 808 from inputting compensation data SS and select signals S1 with respect to the intermediate pixels to the generator 809 after those with respect to the target pixel are received by the compensation signal generator 809.

Figure 43:
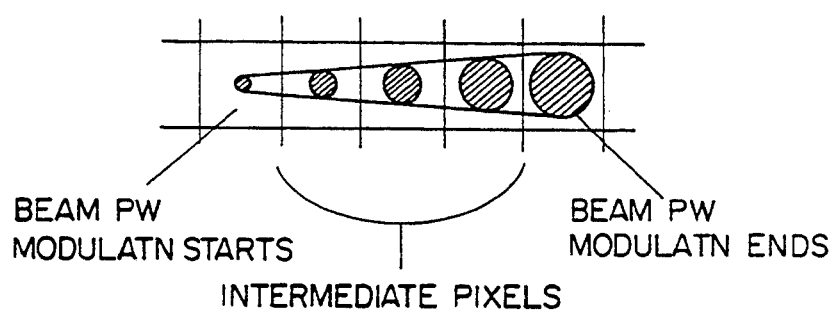
FIG. 43 is a diagram for explaining the beam power modulation performed using the competition signal generator of FIG. 42.

FIG. 43 shows operations performed by the compensation signal generator 809. As described above, the compensation data SS with respect to the target pixel (corresponding to the start point of beam power modulation) is input to the compensation signal generator 809, and the beam power is continuously modulated with respect to five successive pixels so as to produce an image with smooth edges. In FIG. 42, the compensation data SS with respect to the target pixel is input to a beam power data generator LUT 809f. In accordance with the input compensation data SS, this LUT 809f generates a start beam power signal S4, a gradient signal S5, and a blank signal S6. This blank signal S6 is changed to a high level during a prescribed time period, and the laser beam scanning is performed from the start point of the beam power modulation to the end point thereof. In accordance with the blank signal S6, the 3-state buffers 809a and 809b act to inhibit the compensation data SS and the select signal S1 with respect to the intermediate pixels from being supplied to the generator 809. During this time period, an integrator 809h generates a time constant appropriate for the beam power modulation in accordance with the gradient signal S5 supplied by the LUT 809f. A constant current generator 809i supplies the drive current Id to the laser diode driver 810 in accordance with the time constant supplied by the integrator 809h and in accordance with the start beam power signal S4 supplied via a D/A converter 809g. The drive current Id supplied by the constant current generator 809i is continuously varied from a start beam level corresponding to the start beam power signal S4 to a maximum beam power level. A laser diode 810a is driven by the laser diode driver 810 so that it emits a laser beam in accordance with the laser beam power modulation.

On the other hand, when the pulse position modulation is selected in accordance with the select signal S1, the 3-state buffers 809a and 809b are connected to a pulse position data generator LUT 809d by a selector 809c. Each time the compensation data SS with respect to the target pixel is received from the comparator 808, the compensation data SS is input to the pulse position data generator LUT 809d. After the compensation data SS is received, the LUT 809d outputs a pulse position signal S2 and a beam power signal S3. A pulse generator 809e outputs a laser diode drive signal pulse in accordance with the pulse position signal S2 and the beam power signal S3.

FIG. 44 shows operations performed by the compensation signal generator 809 when the beam power modulation is selected. In synchronism with a clock signal, the compensation signal generator 809 carries out the beam power modulation for smoothing edges of images described in dot matrix format. For example, when the laser diode drive current is at state "T1" shown in FIG. 44, the blank signal S6 is at a low level. When a leading edge of the clock signal appears (which signal is at a high level), the compensation data SS and the select signal S1 are input to the compensation signal generator 809 via the 3-state buffers 809a and 809b. After the compensation data SS and the select signal S1 are received, the start beam power level and the gradient of the beam power modulation are determined. Then, the modulation of the laser diode drive current is started. When a trailing edge of the select signal S1 appears, the 3-state buffers 809a and 809b are placed in its cut-off condition, so as to inhibit the compensation data SS and the select signal S1 with respect to intermediate pixels between the start point and the end point thereof from being input to the beam power data generator LUT 809f. This cut-off condition of the buffers 809a and 809b continues from the state "T1" to the state "T3".

When the buffers 809a and 809b are in the cut-off condition, the laser diode drive current continues to increase to a maximum level "Imax" at the state T3. The amount of the change in the drive current is represented by (Imax−Imin) as shown in FIG. 44. When a leading edge of the select signal S1 appears and the drive current is at state T4, the 3-state buffers 809a and 809b are placed in a waiting condition for awaiting the compensation data SS and the select signal which are newly received from the comparator 808. In the fourth embodiment, it is possible to efficiently output an image with smooth edges from an image described in dot matrix format. Also, it is possible to prevent the intensity level of the image from being discontinuous with respect to some successive pixels due to the beam intensity modulation.

Further, the present invention is not limited to the above described embodiments, and various variations and modifications may be made without departing from the scope of the present invention.

What is claimed is:

1. An apparatus for smoothing edges of images, comprising:

first detection means for determining with respect to each pixel of an image, whether or not an edge of the image starts on a scanline when each scanline of the image is scanned, and for defining a control datum based on whether or not said edge starts on the scanline;

second detection means for detecting a duration of beam power modulation corresponding to edge pixels of the image on the scanline, said edge pixels being intersected by a line defined by said image, and for defining a duration datum indicating said duration of beam power modulation;

third detection means for detecting an outermost edge pixel in said edge pixels on the scanline;

means for defining a beam power datum indicating an intensity level of light beam power corresponding to said outermost edge pixel detected by said third detection means;

output means for outputting said image for each scanline, the output means having a light source for emitting a light beam; and control means for modulating light beam power of said light source in a continuous range from said intensity level indicated by said beam power datum to a predetermined level with respect to said edge pixels on the scanline, so that an image with smooth edges is generated by modulating the light beam power in accordance with the control datum and the duration datum.

2. An apparatus according to claim 1, further comprising:

storage means for storing a data set including said control datum, said duration datum and said beam power datum, corresponding to each pixel of an image described in vector data format;

wherein said control means includes means for performing said light beam power modulation for each pixel in accordance with said data stored in said storage means.

3. An apparatus according to claim 1, further comprising:

edge pixel detection means for determining whether a target pixel in said edge pixels is a left-hand edge pixel or a right-hand edge pixel.

4. An apparatus according to claim 1, further comprising:

subpixel detection means for detecting a position within a pixel along the scanline at which the light beam power modulation starts or ends with respect to said edge pixels, and for defining a subpixel datum indicating said position.

5. An apparatus according to claim 3, further comprising:

subpixel detection means for detecting a position within a pixel along the scanline at which the light beam power modulation starts or ends with respect to said edge pixels, and for defining a subpixel datum indicating said position.

6. An apparatus according to claim 3, wherein:

when the target pixel is detected as being a left-hand edge pixel, said light beam power modulation performed by said control means is started, with respect to said edge pixels, from said intensity level indicated by said beam power datum; and when the target pixel is detected as being a right-hand edge pixel, said light beam power modulation ends at said intensity level with respect to said edge pixels.

7. An apparatus for smoothing edges of images described in vector data format, comprising:

first detection means for determining, with respect to a target pixel of an image described in vector data format, whether or not an edge of the image starts on a scanline when each scanline of the image is scanned, and for defining a control datum based on whether or not said edge starts on the scanline;

second detection means for detecting a duration of beam power modulation corresponding to edge pixels of the image on the scanline, said edge pixels being intersected by a vector line defined by said image, and for defining a duration datum indicating said duration of beam power modulation;

subpixel detection means for detecting a position within the target pixel at which the beam power modulation starts or ends with respect to said edge pixels, and for defining a subpixel datum indicating said position within the target pixel;

edge pixel detection means for detecting whether a pixel included in said edge pixels is a left-hand edge pixel or a right-hand edge pixel;

output means for outputting said image for each scanline, the output means having a light source that emits a light beam through light beam power modulation; and control means for modulating light beam power of said light source in a continuous range from a minimum intensity level of said light source to a reference level with respect to said edge pixels on the scanline, so that an image with smooth edges is generated by said output means by modulating the light beam power in accordance with the control datum and the duration datum;

wherein said control means includes means for modulating said light beam power from said minimum intensity level continuously to said reference level with respect to said edge pixels when the pixel included in the edge pixels is detected as being a left-hand edge pixel, and, when the pixel is detected as being a right-hand edge pixel, for modulating said light beam power from said reference level continuously to said minimum intensity level with respect to said edge pixels.

8. An apparatus for smoothing edges of images described in vector data format, comprising:

first detection means for determining, with respect to a target pixel of an image described in vector data format, whether or not an edge of the image starts on a scanline when each scanline of the image is scanned, and for defining a control datum depending on whether or not said edge starts on the scanline;

second detection means for detecting a duration of beam power modulation corresponding to edge pixels of the image on the scanline, said edge pixels being intersected by a line defined by said image, and for defining a duration datum indicating said duration of beam power modulation;

subpixel detection means for detecting a position within the target pixel at which the beam power modulation starts or ends with respect to said edge pixels, and for defining a subpixel datum indicating said position;

intensity detection means for detecting a first level of intensity corresponding to a background pixel immediately preceding said edge pixels on the scanline, and for detecting a second level of intensity corresponding to a pixel immediately following said edge pixels on the scanline;

output means for outputting said image for each scanline, the output means having a light source which emits a light beam through light beam power modulation; and control means for modulating light beam power of said light source in a continuous range from a minimum intensity level of said light source to a reference level with respect to said edge pixels on the scanline, so that an image with smooth edges is generated by said output means by modulating the light beam power in accordance with the control datum and the duration datum, wherein said control means includes means for modulating said light beam power from said minimum intensity level continuously to said reference level with respect to said edge pixels when the pixel included in the edge pixels is detected as being a left-hand edge pixel, and, when the pixel is detected as being a right-hand edge pixel, for modulating said light beam power from said reference level continuously to said minimum intensity level with respect to said edge pixels.

9. An apparatus according to claim 8, further comprising:

edge pixel detection means for detecting whether a pixel included in said edge pixels is a left-hand edge pixel or a right-hand edge pixel on the scanline;

wherein said light beam power is modulated from said first level continuously to said second level with respect to said edge pixels when the pixel included in the edge pixels is detected as being a left-hand edge pixel, and, when the pixel is detected as being a right-hand edge pixel, said light beam power is modulated from said second level continuously to said first level with respect to said edge pixels.

10. An apparatus for smoothing edges of images described in dot matrix format, comprising:

comparator means for generating compensation data when a dot matrix of an image described in dot matrix format accords with a predetermined standard pattern;

first means for generating a control datum indicating a start or an end of light beam power modulation by determining whether or not an edge of the image starts on a scanline, with respect to a target pixel of the image, said control datum being contained in said compensation data of said comparator data means;

second means for generating a duration datum indicating a duration of beam power modulation corresponding to edge pixels of the image, said duration datum being contained in the compensation data of said comparator means;

output means for outputting an image for each scanline, the output means having a light source which emits a light beam through light beam power modulation; and control means for modulating light beam power of said light source in a continuous range from a minimum level of intensity of the light source to a second level of the intensity thereof for the duration indicated by the duration datum, said light beam power modulation starting from a position indicated by the control datum, so that an image with smooth edges is output by said output means.

* * * * *